(12) United States Patent
Nakagawa

(10) Patent No.: US 8,437,589 B2
(45) Date of Patent: May 7, 2013

(54) OPTICAL MODULE

(75) Inventor: Goji Nakagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 287 days.

(21) Appl. No.: 12/895,055

(22) Filed: Sep. 30, 2010

(65) Prior Publication Data

US 2011/0081112 A1    Apr. 7, 2011

(30) Foreign Application Priority Data

Oct. 1, 2009    (JP) .................. 2009-229458

(51) Int. Cl.
*G02B 6/32* (2006.01)
*F21V 5/04* (2006.01)

(52) U.S. Cl.
USPC ............. 385/33; 385/38; 385/89; 362/268; 362/311.12

(58) Field of Classification Search ............ 385/38; 362/268, 311.12
See application file for complete search history.

(56) References Cited

U.S. PATENT DOCUMENTS 7,702,197 B2    4/2010    Nakagawa

FOREIGN PATENT DOCUMENTS

| GB | 2441155 | 2/2008 |
| JP | 2007-033853 A | 2/2007 |
| JP | 2008-235376 A | 10/2008 |

OTHER PUBLICATIONS

Farries, M.C., et al., "Analysis of Antireflection Coatings on Angled Facet Semiconductor Laser Amplifiers", Electronics Letters, vol. 26, Mar. 15, 1990, pp. 381-382.
"United Kingdom Search Report", mailed by UK Patent Office corresponding to UK patent application No. 1015707.1 on Jan. 17, 2011.

*Primary Examiner* — Jerry Rahll
(74) *Attorney, Agent, or Firm* — Fujitsu Patent Center

(57) ABSTRACT

In an optical module, an optical element array is an array of optical elements. Further, a lens array is an array of a plurality of lenses. An output point of a light beam of each optical element of the optical element array is caused to coincide with a central line of a corresponding lens of the lens array, and the light beam is made incident on the lens and a parallel beam is output from the lens. When the output point of the light beam of the optical element coincides with an optical axis of the lens, an optical path within the optical element and the optical axis of the lens fail to coincide with each other.

12 Claims, 30 Drawing Sheets

OPTICAL MODULE

CROSS-REFERENCE TO RELATED APPLICATION

This application is based upon and claims the benefit of priority of the prior Japanese Patent Application No. 2009-229458, filed on Oct. 1, 2009, the entire contents of which are incorporated herein by reference.

FIELD

The embodiment discussed herein is related to an optical module.

BACKGROUND

In recent years, the distance and capacity of an optical communication network have been increasing with a growing demand for a communication made by a broadband service. For example, high-speed and large-capacity WDM (Wavelength Division Multiplexing for simultaneously transmitting a plurality of signals with a single optical fiber by multiplexing light beams of different wavelengths) is currently under development.

In the meantime, a higher-speed, larger-capacity and flexible optical communication network has been demanded with the rapid popularization of the Internet, and an increase in large capacity content. An optical packet switching technique draws attention as a technique for building such an optical communication network.

The optical packet switching is a technique for making packet switching by using communication information totally unchanged as light. This technique eliminates restrictions on an electronic processing speed in comparison with conventional switching for once converting an optical signal into an electric signal. Therefore, the processing speed depends on only the propagation delay time of light, and accordingly, a high-speed and large-capacity transmission can be made.

If an optical signal is switched in units of packets, gate switches are used to turn on/off the optical signal. The gate switches for turning on/off an optical signal with an electric control mainly include an electro-absorption gate switch and a semiconductor optical amplifier gate switch. The electro-absorption gate switch is intended to change optical absorption by using electro-absorption effect. However, this gate switch has a disadvantage of a large loss even in a transmission state. In contrast, the semiconductor optical amplifier gate switch is intended to change a gain with a driving current applied to a semiconductor amplifier, and has not only a function as an optical gate for turning light on/off but also an amplification function (to amplify and output light when a gate is turned on). Accordingly, this gate switch currently attracts attention as an optical element that reduces a loss of an optical signal and makes high-speed switching.

For an SOA, its extinction ratio of ON (open) to OFF (closed) of a gate is high, and its amplification mechanism can reduce an optical loss. Since the SOA is an optical element formed with a semiconductor, it has an advantage of downsizing enabled at low cost with a semiconductor integration technique. (The extinction ratio is a ratio of the average light intensity of signals "1" and "0" when a gate is ON to that of signals "1" and "0" when the gate is OFF. As the extinction ratio becomes higher, ON/OFF of a gate can be more explicitly identified. As a result, signal crosstalk that affects another port can be reduced, and a bit error rate becomes low.)

In the meantime, reductions in the size, the consumed power and the cost of a module or a device by collectively forming a plurality of channels, namely, by arraying a plurality of channels have been demanded for an optical gate switch.

Japanese Laid-open Patent publication No. 2007-33853.
Japanese Laid-open Patent publication No. 2008-235376.
Farries, M. C. Buus, J. Robbins, D. J. "Analysis of antireflection coatings on angled facet semiconductor laser amplifiers," Electronics Letters, 15 Mar. 1990, Volume: 26, pp. 381-382.

Normally, when optical coupling between an optical element that outputs light and an optical fiber is made, the optical element and a first lens are optically coupled at first and output light from the optical element is converted into parallel light by the first lens. Then, there is used a configuration in which its parallel light is condensed by a second lens to be made incident on the optical fiber (Also, there is used a configuration in which parallel light is generated to be condensed into the optical fiber only by the first lens).

FIG. 23 illustrates optical coupling between a laser diode (LD) and a lens. FIG. 23 illustrates the optical coupling at the time of using a single channel LD as the optical element. In addition, in a subsequent description, the optical element and the first lens are illustrated, and the second lens that condenses parallel light and the optical fiber are omitted.

FIG. 23 illustrates a configuration in which a central point (central line) of a spread angle of output light from the LD 51 is caused to coincide with a central line of the lens 52 and the output light from the LD 51 is converted into parallel light by the lens 52.

FIG. 24 illustrates the optical coupling between the LD array and the lens array. FIG. 24 illustrates a case of four channels as the optical coupling of multi-channel. An LD array 51a is one obtained by arraying four LDs and a lens array 52a is one obtained by arraying four lenses.

Similarly to FIG. 23, the central point of a spread angle of output light from each LD of the LD array 51a is caused to coincide with the central line of a corresponding lens of the lens array 52a, thereby outputting parallel light from the lens array 52a. The LD array 51a and the lens array 52a have the same array pitch.

Next, consider a case where the optical coupling is made by using the SOA in place of the LD. Here, for an optical gate switch using an SOA, a reflectance of the light output end face of the SOA must be reduced in order to prevent an oscillation caused by the internal reflection of the SOA.

For this purpose, an Anti Reflection (AR) coat as a non-reflective film is normally applied to an end face of an SOA chip. Further, since a reflection attenuation amount is not sufficiently reduced only based on the AR coat, there is further adopted a configuration in which reflected return light is suppressed by using a shape in which an intra-SOA waveguide is inclined.

FIG. 25 illustrates an SOA array. FIG. 25 illustrates an SOA array 61a obtained by arraying the SOA of four channels. An AR coat is applied to each end face of the SOA of the SOA array 61a. Further, an intra-SOA waveguide L is obliquely formed such that light is output obliquely, for example, by 22.3 degrees with respect to the normal to the end face of the SOA array.

By adopting the above-described structure, even if light passing through the intra-SOA waveguide L is reflected on a chip end face of the SOA, its reflected light goes back in the direction A illustrated in FIG. 25. For this reason, the reflected light is prevented from returning again to the intra-SOA waveguide L and from causing interference, thus suppressing reflected return light. While FIG. 25 illustrates only the central point (central line) of a spread angle of the output light beam (light beam spread angle), a light beam output from the SOA of each channel has a certain spread angle.

Next, optical coupling between the SOA and the lens will be described. FIG. 26 illustrates the optical coupling between the SOA and the lens. FIG. 26 illustrates the optical coupling of a single-channel SOA. When making optical coupling between the SOA 61 and the lens 62, the central point of the light beam spread angle of the SOA 61 is inclined obliquely as described above. Accordingly, as illustrated in FIG. 26, a central line of output light from the SOA 61 is made incident obliquely to a central position p0 of the lens 62 in a state where an end face of the SOA 61 and a main face of the lens 62 are arranged in parallel.

FIG. 27 illustrates optical coupling between the SOA array and the lens array. The optical module 6 makes optical coupling of a multi-channel SOA module. Similarly to FIG. 26, light that is output obliquely by 22.3 degrees with respect to an end face of the SOA is made incident on the lens array 62a with the same array pitch as that of the SOA array 61a, thus making the optical coupling.

In configurations illustrated in FIGS. 26 and 27, (disclosed in Japanese Laid-open Patent publication No. 2007-33853 as described above), output light from the SOA array 61a is incident obliquely to the central point of each lens of the lens array 62a (central beam of output light from each SOA of the SOA array 61a and a central line of a corresponding lens of the lens array 62a are not parallel to each other). Therefore, among beams after passing through the lens array 62a, a central beam b0 in the beam spread angle of the SOA and two arbitrary refracted beams b1 and b2 other than the central beam b0 do not become parallel. For the above-described reason, there is a problem that parallel beams are not generated in the lens array 62a and an optical coupling loss increases with respect to the optical fiber array arranged in a subsequent stage (not illustrated).

To cope with the above-described problem, in a conventional technique disclosed in Japanese Laid-open Patent publication No. 2008-235376 as described above, the optical coupling is made by causing a central line of the beam spread angle of the SOA to coincide with that of the lens in the same manner as in a case of the LD.

FIG. 28 illustrates optical coupling between the SOA and the lens. In the optical module 6, a central beam of output light from the SOA 61 coincides with a central line of the lens 62 in parallel. When the SOA 61 and the lens 62 are arranged as described above, the central beam in the beam spread angle of the SOA 61 and the refracted side beams go to the same direction. Therefore, the parallel beams from the lens 62 are output and an increase in the optical coupling loss can be suppressed.

FIG. 29 illustrates optical coupling between the SOA array and the lens array. FIG. 29 illustrates a state where the SOA array 61-1 provided with steps and the lens array 62a are arranged in the optical module 6-1.

To enable the central beam of output light from the SOA 61 to coincide with the central line of the lens 62, as illustrated in FIG. 28, and to enable channels to have the same distance between the SOA end face and the lens main face, the SOA array 61-1 having the steps in the array of the SOA chips, as illustrated in FIG. 29, is manufactured.

FIG. 30 illustrates a configuration in which optical coupling between the SOA array and the lens array is made. FIG. 30 illustrates a state where the SOA array 61a and the lens array 62-1 provided with steps are arranged in the optical module 6-2.

To enable the central beam of output light from the SOA 61 to coincide with the central line of the lens 62, as illustrated in FIG. 28, and to enable the channels to have the same distance between the SOA end face and the lens main face, the SOA array 62-1 having the step in the array of the lens, as illustrated in FIG. 30, is manufactured.

However, also in both of the configurations of FIGS. 29 and 30, the SOA array 61-1 and the lens array 62-1 have distorted shapes, and the SOA array 61-1 and the lens array 62-1 on which the above-described steps are provided are difficult to manufacture. As a result, a component manufacturing cost of the SOA array 61-1 and the lens array 62-1 largely increases.

As described above, in the conventional structure (optical module 6) illustrated in FIG. 27, since parallel light is not generated, the optical coupling loss increases with respect to the optical fiber arranged at a subsequent stage. In the conventional structures (optical modules 6-1 and 6-2) illustrated in FIGS. 29 and 30, parallel light is generated; however, manufacturing the SOA array or lens array with a complicated shape costs higher.

SUMMARY

According to one aspect of the present invention, this optical module includes: an optical element array being an array of a plurality of optical elements each outputting a light beam in a direction oblique to a normal to an end face thereof; and a lens array comprising a plurality of lenses corresponding to the respective optical elements; wherein an output point of the light beam of each optical element is on a central line of the corresponding lens.

The object and advantages of the invention will be realized and attained by means of the devices and combinations particularly pointed out in the claims.

It is to be understood that both the foregoing general description and the following detailed description are exemplary and explanatory and are not restrictive of the invention, as claimed.

DESCRIPTION OF EMBODIMENT

Figure 1:
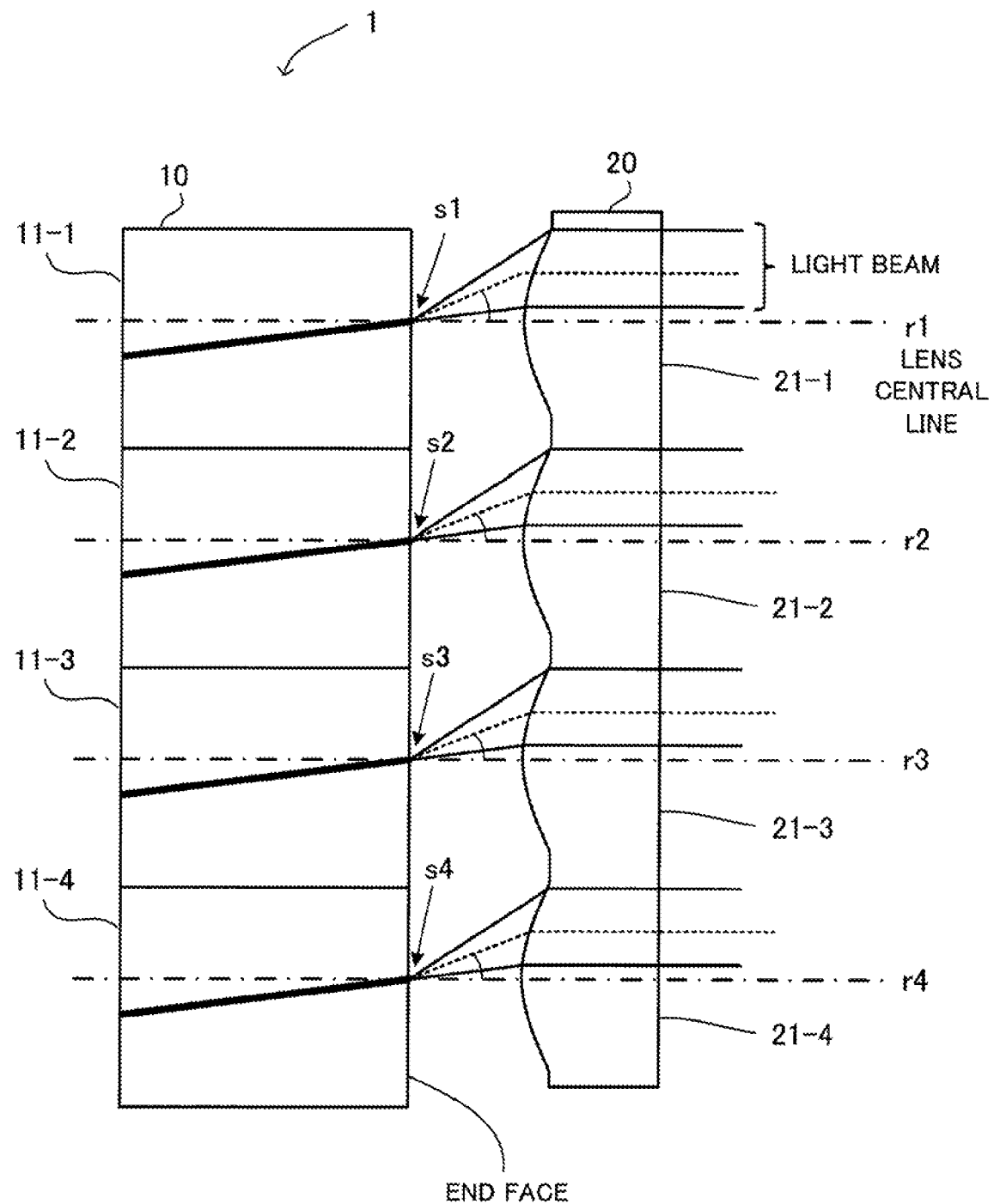
FIGS. 1 to 4 illustrate example configurations of an optical module.

A preferred embodiment of the present invention will now be described in detail below with reference to the accompanying drawings, wherein like reference numerals refer to like elements throughout. FIG. 1 illustrates a configuration example of an optical module. The illustrated optical module 1 includes an optical element array 10 and a lens array 20. The optical element array 10 is an array of a plurality of optical elements that obliquely output light beams with a significant angle with respect to a normal (the same as a central line of a lens of FIG. 1) to an element end face thereof. FIG. 1 illustrates an array of four optical elements 11-1 to 11-4 for four channels.

In addition, the optical element array 10 refers to, for example, an SOA array. In the subsequent description, an SOA array 10 that is an array of SOAs 11-1 to 11-4 (collectively named an SOA 11) will be described as the optical element array 10.

The lens array 20 has a structure in which a plurality of lenses are arrayed. Specifically, the lens array 20 has an array structure in which four lenses 21-1 to 21-4 (collectively named lens 21) are arrayed.

Here, an output point (luminous point) of a light beam of the SOA array 10 is caused to coincide with a central line of a lens (central line of the lens convex part) of the lens array 20. Light beams output from the SOAs 11-1 to 11-4 are made incident on the lenses 21-1 to 21-4, respectively.

That is, an output point s1 of a light beam of the SOA 11-1 is caused to coincide with a central line r1 of the lens 21-1, and the light beam output from the SOA 11-1 is made incident on the lens 21-1. In a similar fashion, an output point s2 of a light beam from the SOA 11-2 is caused to coincide with a central line r2 of the lens 21-2, and the light beam output from the SOA 11-2 is made incident on the lens 21-2.

An output point s3 of a light beam from the SOA 11-3 is caused to coincide with a central line r3 of the lens 21-3, and the light beam output from the SOA 11-3 is made incident on the lens 21-3. Further, an output point s4 of a light beam from the SOA 11-4 is caused to coincide with a central line r4 of the lens 21-4, and the light beam output from the SOA 11-4 is made incident on the lens 21-4.

As described above, a light output end face of the SOA array 10 is arranged in parallel with a lens main face of the lens array 20. Further, an output point of a light beam obliquely output from each SOA is caused to coincide with a central line of a corresponding lens, and the light beam is made incident on the lens.

This configuration makes it possible to generate parallel lights for a plurality of channels in the lens array 20 and suppress optical connection loss to the optical fiber array (not illustrated) arranged at a subsequent stage. Further, the need for providing steps, as in a conventional array, is eliminated, so a manufacturing cost may be reduced.

Figure 2:
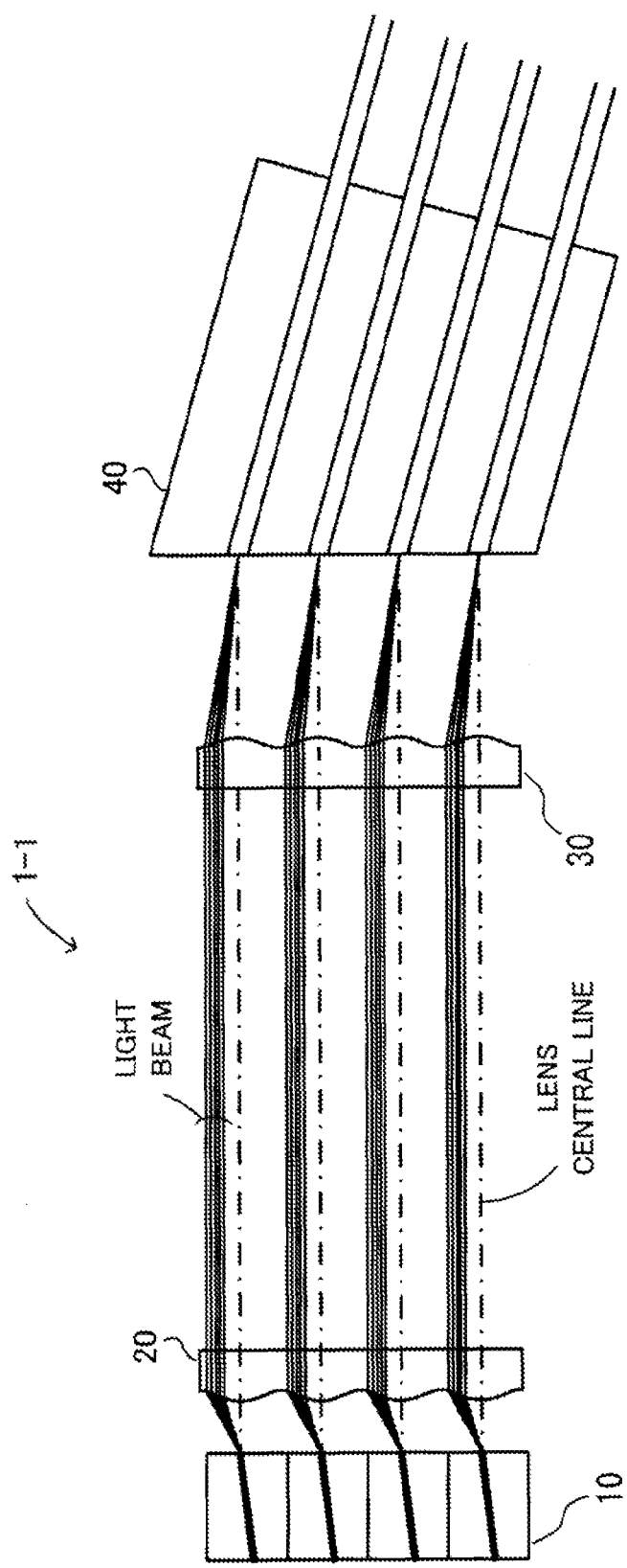

Next, a configuration of the optical module including a condenser lens array and an optical fiber array will be described. FIG. 2 illustrates a configuration example of the optical module. The illustrated optical module 1-1 includes an SOA array 10, a lens array 20, a condenser lens array 30, and an optical fiber array 40, as an example configuration for making the optical coupling of four channels.

The condenser lens array 30 is an array of a plurality of (here, four channels) condenser lenses corresponding to the respective optical fibers, and each condenser lens condenses parallel beams from the corresponding lens of the lens array 20 into the corresponding optical fiber. The optical fiber array 40 is an array of a plurality of (here, four channels) optical fibers of, for example, SMF (Single Mode Fiber).

In the optical module 1-1, in an optical coupling portion between the SOA array 10 and the lens array 20, or an optical coupling portion between the condenser lens array 30 and the optical fiber array 40, all light beams pass through an off-center point on one side surface of a lens.

Elements are arranged such that the lens array 20 and the condenser lens array 30 are paired up with each other. At this time, the elements are arranged such that focuses of the lens array 20 and those of the condenser lens array 30 coincide with each other, and the optical coupling is made using a confocal system.

Further, a lens main face of the lens array 20, that of the condenser lens array 30, and an input end face of the optical fiber array 40 are arranged in parallel to an output end face of the SOA array 10. Parallel arrangement suppresses deviation in the optical coupling loss among the channel elements.

Further, the condenser lens array 30 and the optical fiber array 40 are arranged such that an input point of each optical fiber of the optical fiber array 40 coincides with the central line of the corresponding condenser lens of the condenser lens array 30. This arrangement suppresses the optical coupling loss between the condenser lens and the optical fiber.

Here, the lens of the lens array 20 includes one of a front surface and rear surface having a flat-plate structure, and suppose, for example, that the front surface has a convex part and the rear surface has a flat-plate part. Also, the lens of the condenser lens array 30 includes one of a front surface and rear surface having a flat-plate structure, and suppose, for example, that the front surface has a convex part and the rear surface has a flat-plate part.

In the optical module 1-1, the lens array 20 is arranged such that the front surface of the lens having the convex part faces the SOA array 10 and the rear surface having the flat-plate part faces the optical fiber array 40. Further, the condenser lens of the condenser lens array 30 is arranged such that the front surface having the convex part faces a side of the optical fiber array 40 and the rear surface having the flat-plate part faces the SOA array 10.

Figure 3:
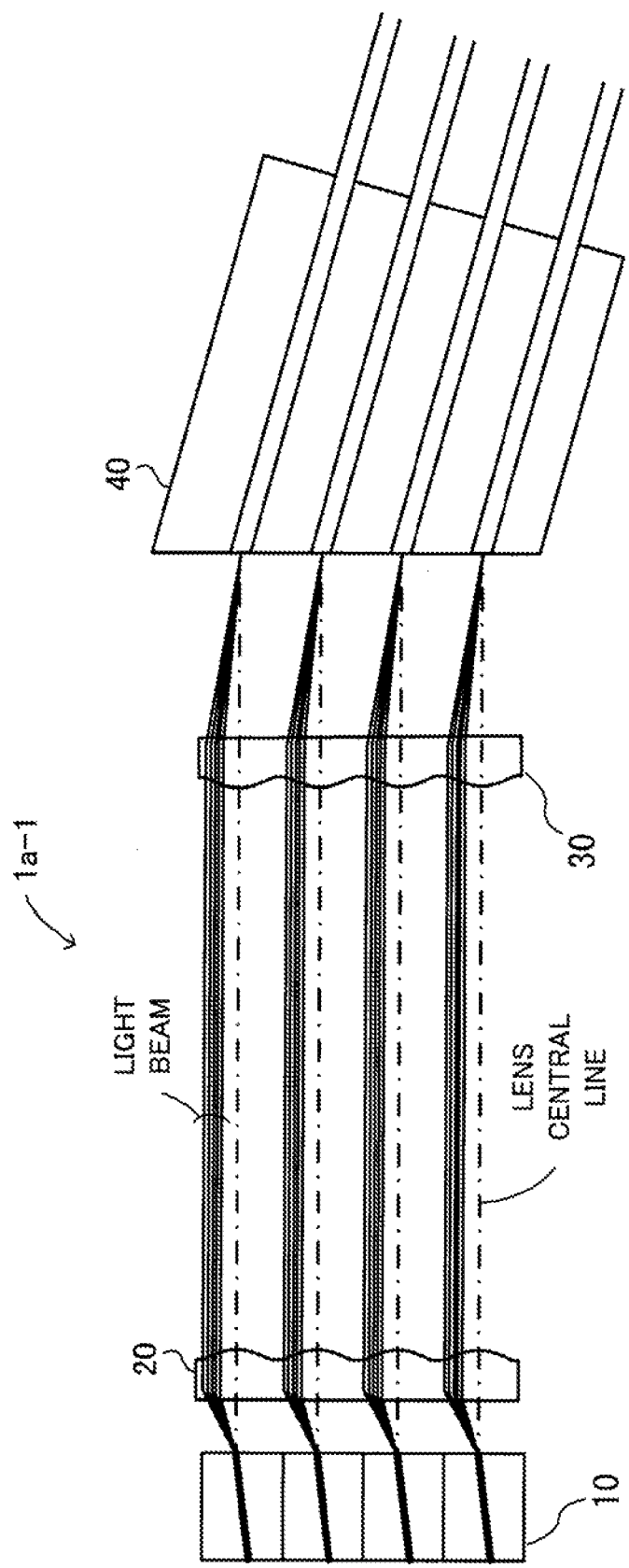

FIG. 3 illustrates an example configuration of the optical module. The illustrated optical module 1a-1 includes the SOA array 10, the lens array 20, the condenser lens array 30, and the optical fiber array 40. A point different from FIG. 2 is that each of the lens array 20 and the condenser lens array 30 is arranged the other way around.

In the optical module 1a-1, the lens array 20 is arranged such that the rear surface having the flat-plate part faces the SOA array 10 and the front surface having the convex part faces the optical fiber array 40. Also, the condenser lens array 30 is arranged such that the rear surface having the flat-plate part faces the optical fiber array 40 and the front surface having the convex part faces the SOA array 10.

In the case of the structure in which the optical module 1-1 illustrated in FIG. 2 is arranged, reflection possibly occurs to generate reflected return light on the flat-plate parts of the lens array 20 and the condenser lens array 30. As compared with the above-described case of FIG. 2, in the case of the structure in which the optical module 1a-1 illustrated in FIG. 3 is arranged, reflection that occurs on the flat-plate parts of the lens array 20 and the condenser lens array 30 can be reduced.

Figure 4:
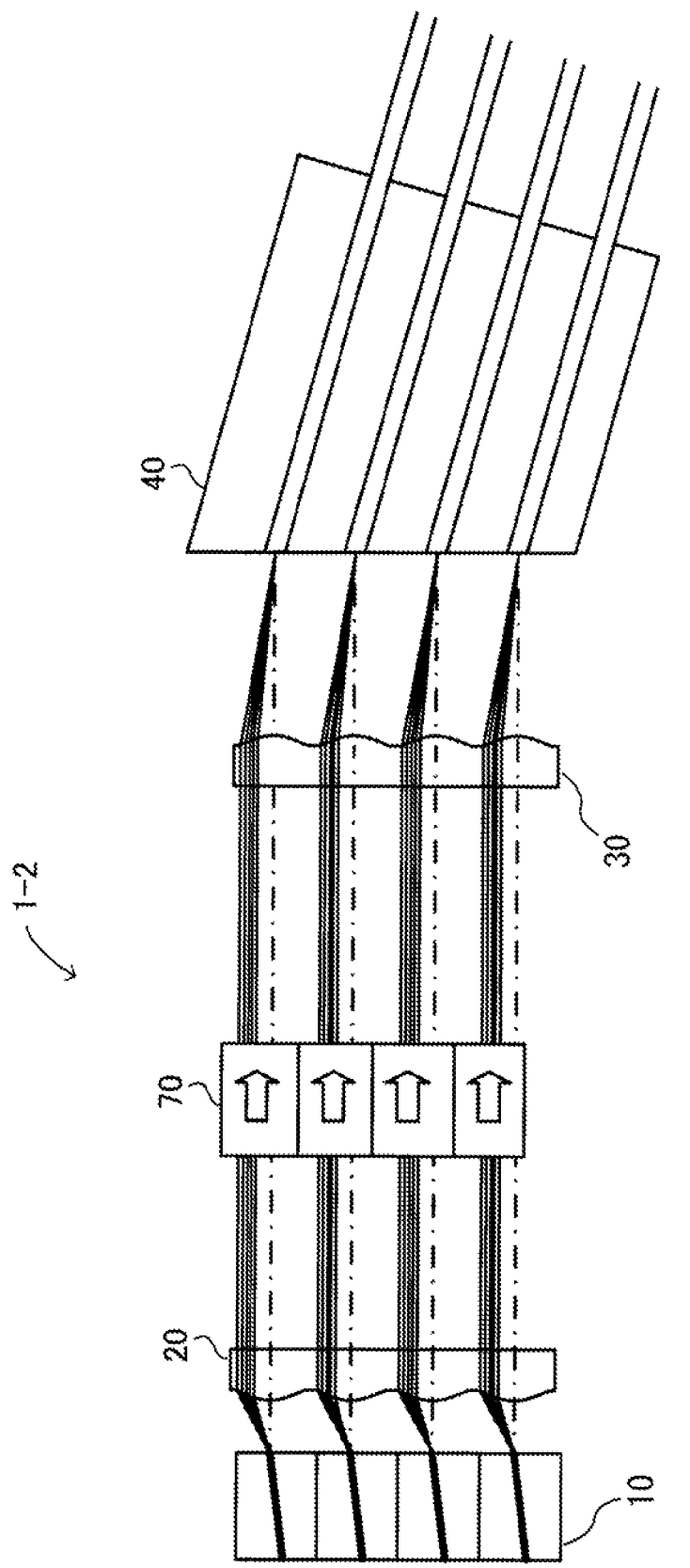

Next, an optical module with an array isolator will be described. FIG. 4 illustrates an example configuration of the optical module. The illustrated optical module 1-2 includes the SOA array 10, the lens array 20, the condenser lens array 30, the optical fiber array 40, and the array isolator 70.

The array isolator 70 is a device having an array structure in which a plurality of optical isolators are arranged between the lens array 20 and the condenser lens array 30. In addition, the optical isolator is a device that passes necessary light only in the direction of an arrow of FIG. 4 and prevents light from passing in the opposite direction.

The array isolator 70 blocks reflected return light generated at the outside of the optical module 1-2. Specifically, when signal light output from the optical fiber array 40 may reflect within a system, the array isolator 70 can block an incidence of the reflected return light to the SOA array 10.

Figure 5:
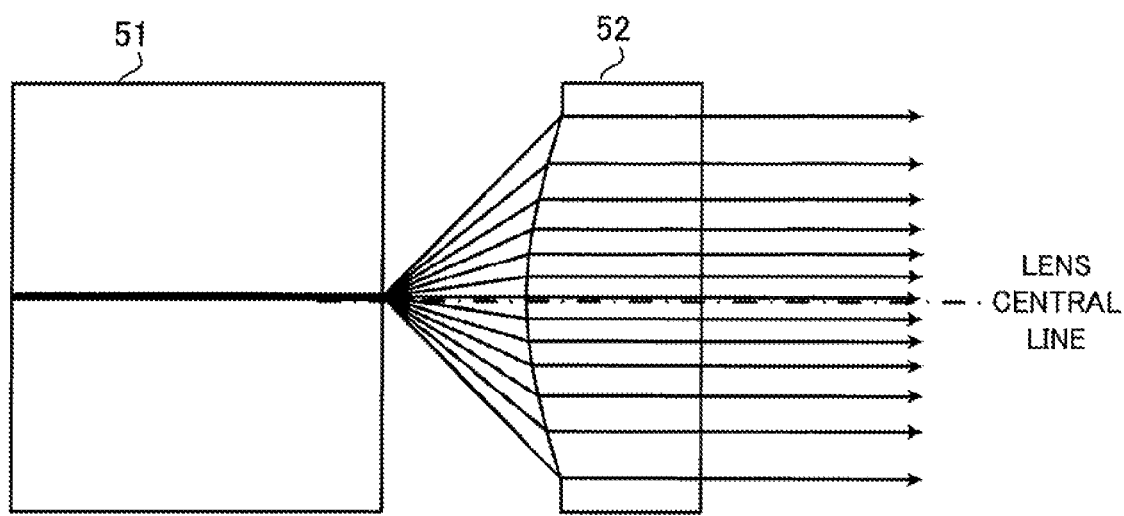
FIG. 5 illustrates optical coupling between a laser diode (LD) and a lens.

Next, a reason why parallel light is generated by the structure of the optical module 1 will be described. FIG. 5 illustrates optical coupling between an LD and a lens. An output end face of an LD 51 and a lens main face of a lens 52 are arranged in parallel, and a central point of an output beam spread angle of the LD 51 coincides with a central line of the lens 52.

Regardless of the output beam spread angle, all light beams vertically output from the end face of the LD 51 pass through the lens 52 to be focused in parallel, whereby parallel light beams are output from the lens 52.

Figure 6:
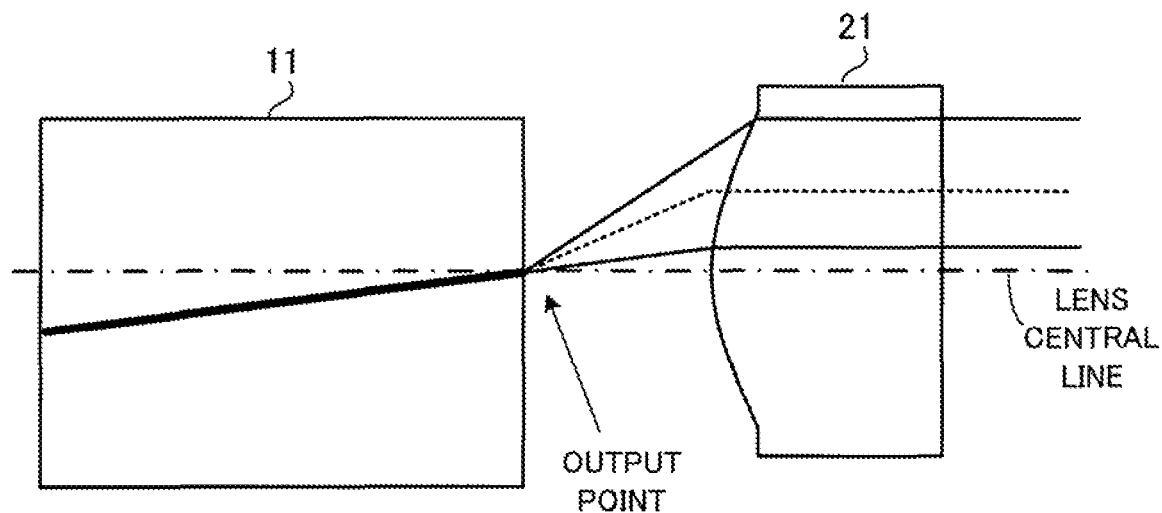
FIG. 6 illustrates the optical coupling between an SOA and the lens.

FIG. 6 illustrates optical coupling between an SOA and a lens. Focusing attention on a configuration illustrated in FIG. 5, an output end face of the SOA 11 and a lens main face of the lens 21 are arranged in parallel. Further, an output point of a light beam obliquely output from the SOA 11 is caused to coincide with a central line of the lens 21, thereby making output light from the SOA 11 incident on one side face of the lens 21. In this case, a focal position of the lens 21 and an output point of the SOA 21 coincide with each other.

Also, as to light beams obliquely output from the SOA 11, the above-described arrangement permits all light beams of a spread angle to be condensed in parallel by the lens 21 and parallel light beams to be output from the lens 21. In this description, a single-channel configuration will be described as an example. Further, much the same is true on a multi-channel array configuration.

Next, features of the lens 21 of the lens array 20 will be described. As the lens 21, an aplanatic lens (or a low aberration lens with a small spherical aberration) with no spherical aberration is used. A spherical aberration will be first described. In addition, an aberration is a performance error resulting from imperfection of an imaging of an optical system, and a geometric displacement of the imaging from an ideal image. The spherical aberration is used as one aberration of an optical system.

The spherical aberration is defined as a phenomenon where when various parallel light beams are incident on an optical axis of an optical system, their corresponding image points fail to be focused on one point (simply, a phenomenon where focal points are different depending on a position of a sphere).

Figure 7:
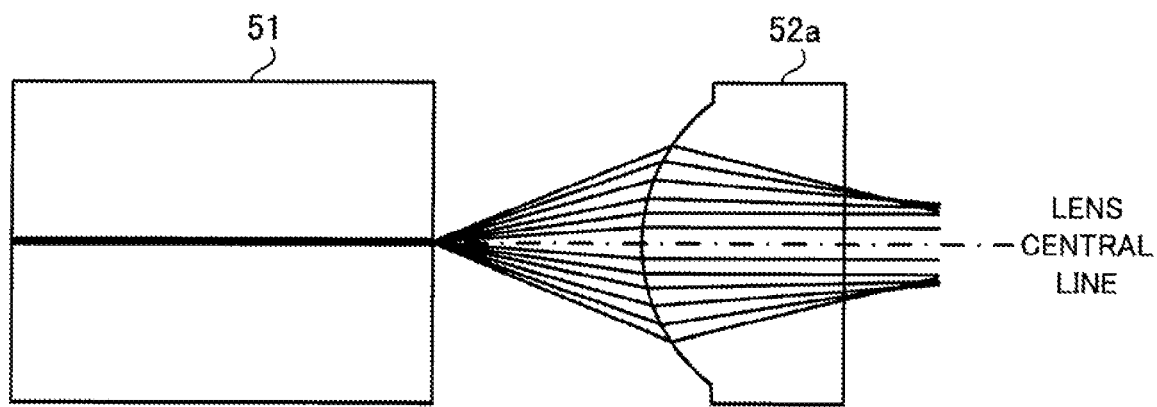
FIG. 7 illustrates an optical path of a spherical lens.

FIG. 7 illustrates an optical path of a spherical lens. The spherical lens 52a is a lens a spherical portion of which is a part of a full sphere, and a mass-production lens that is inexpensive to manufacture. Note that the spherical lens 52a has a spherical aberration and a characteristic in which its aberration is the smallest at the central point of the sphere and increases in a radial direction.

Consider a case where light is made incident on the above-described spherical lens 52a. An output point of the LD 51 and a central point of the spherical lens 52a are caused to coincide with each other, and output light from the LD 51 is made incident on the spherical lens 52a. At this time, since the spherical lens 52a has a spherical aberration, an aberration is small around the central point of the sphere, and therefore, parallel light is generated. On the other hand, since both of an aberration and a refractive index increase in the radial direction, an optical path is bent to the inner side and parallel light fails to be generated.

Figure 8:
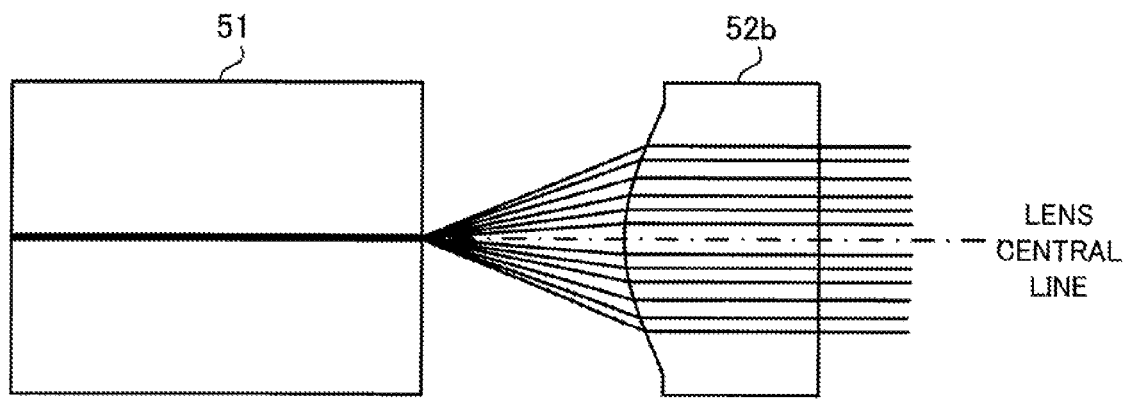
FIG. 8 illustrates an optical path of an aplanatic lens.

FIG. 8 illustrates an optical path of an aplanatic lens. The aplanatic lens 52b is an aspherical lens where a spherical lens has an increased curvature radius and is manufactured such that parallel light is obtained at all points of the sphere.

An output point of the LD 51 and a central point of the aplanatic lens 52b are caused to coincide with each other, and output light from the LD 51 is made incident on the aplanatic lens 52b. At this time, since the aplanatic lens 52b has no spherical aberration, all light beams are condensed in parallel and parallel light beams are output. In the optical module 1, the above-described lens with no spherical aberration (or lens with a small spherical aberration) is used as the lens 21 of the lens array 20.

On the other hand, as another feature of the lens array 20, there can be used a lens array obtained by arraying a distributed refractive index lens whose refractive index decreases in a radial direction. When using the distributed refractive index lens, reflection of the light beam obliquely incident from the SOA 11 can be reduced.

Low melting-point glass is used as a material of the lenses of the lens array 20. Since the low melting-point glass is glass with high fluidity, the lens array 20 can be easily manufactured at the time of arraying a plurality of lenses.

Figure 9:
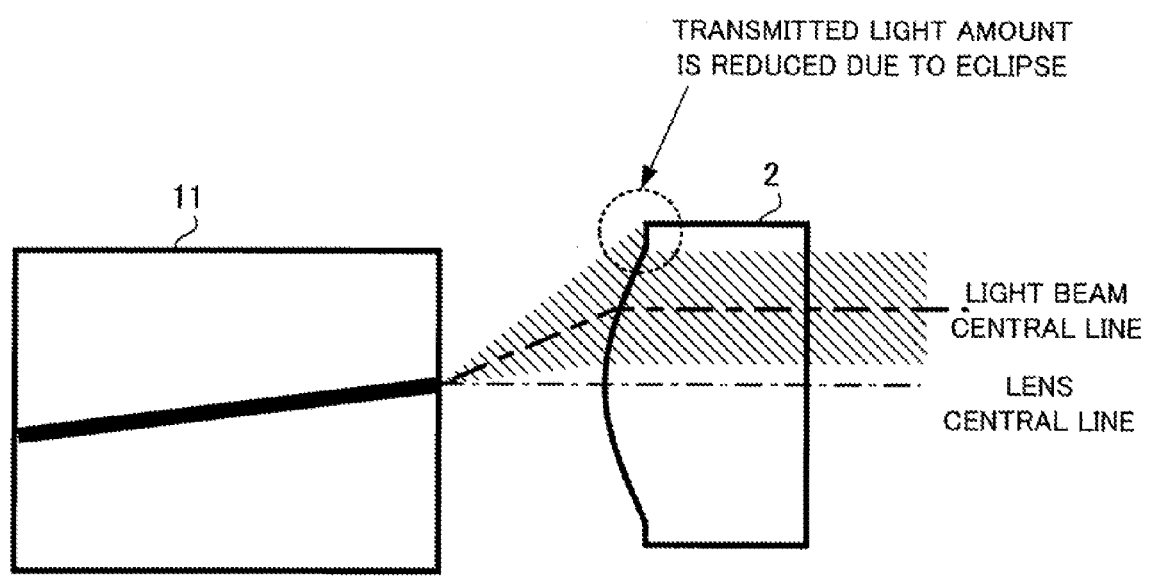
FIG. 9 illustrates a state where an eclipse occurs.

Next, an eclipse and numerical aperture (NA) of a lens will be described. FIG. 9 illustrates a state where an eclipse occurs. When a light beam obliquely output from the SOA 11 is made incident on the lens 2, a portion in which light is projected from the lens 2 as illustrated in FIG. 9, namely, a portion of an "eclipse" may occur due to a light beam spread angle.

The eclipse is a phenomenon in which effective light beams passing through an optical system are shaded. When light shines on a surface except a surface functioning as a lens, the eclipse occurs. Since light is prevented from being taken in that portion, the amount of light is reduced.

Figure 10:
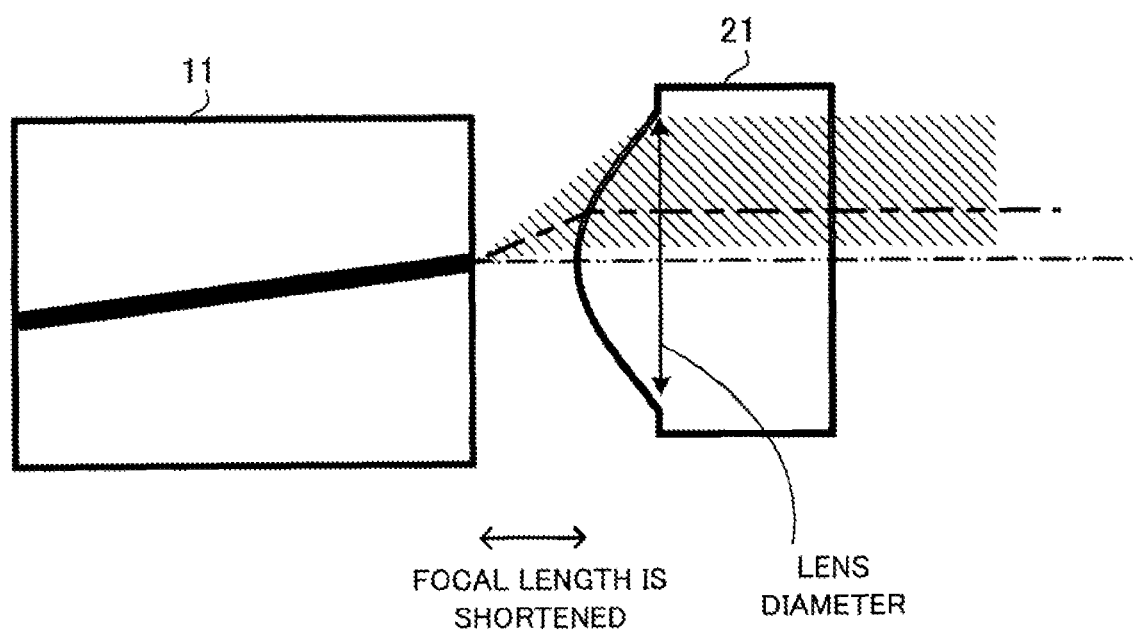
FIG. 10 illustrates optical coupling using a lens with a high NA.

FIG. 10 illustrates optical coupling by using a lens with a high NA. The NA is one index illustrating optical performance of a lens, and represented by sine of half angle of a maximum cone angle of a light beam incident on or output from the lens. As having a larger NA, a lens can take more light.

Figure 11:
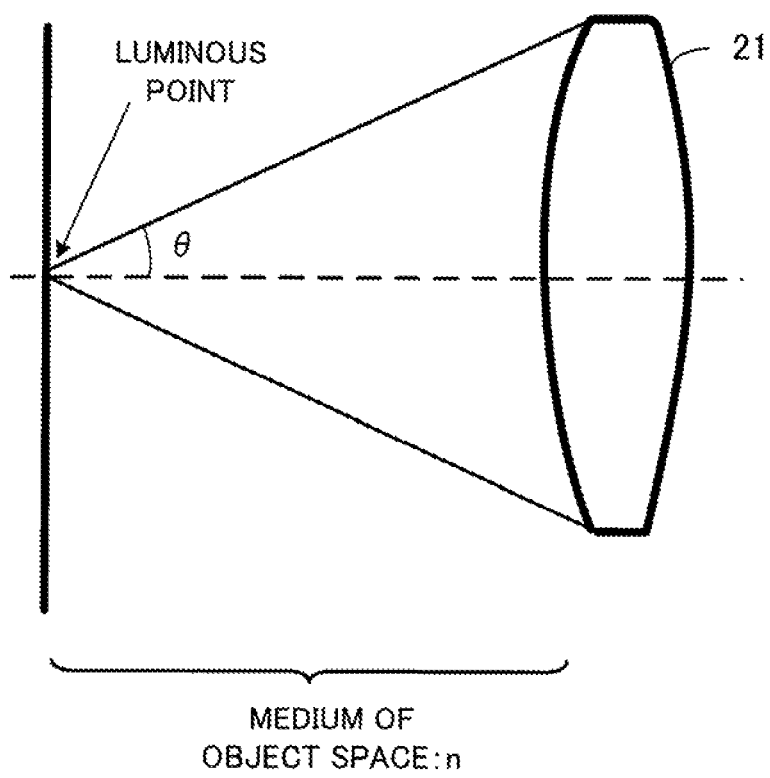
FIG. 11 illustrates an NA.

FIG. 11 illustrates the NA. The NA is represented by the following formula (1):

$$NA = n \cdot \sin\theta \quad (1)$$

where n is a refractive index of a medium of an object space, and θ is a half angle of the maximum cone angle with respect to the lens 21 in the medium of the object space.

In the lens 21, it is important to take output light from the SOA 11 as much as possible and prevent deterioration or optical coupling loss due to the eclipse. For this purpose, the NA of the lens 21 needs to be increased. According to the formula (1), θ may be increased to increase the NA. To this end, a focal distance may be shortened or a lens system may be enlarged.

In the case of the lens 21 of FIG. 10, the lens system is not changed as compared with the lens 2 of FIG. 9. However, when the amount of the bulge of a lens surface of the lens 21 is increased to shorten a focal distance, a value of the NA increases. Use of the above-described lens 21 with a high NA prevents the eclipse from occurring.

Figure 12:
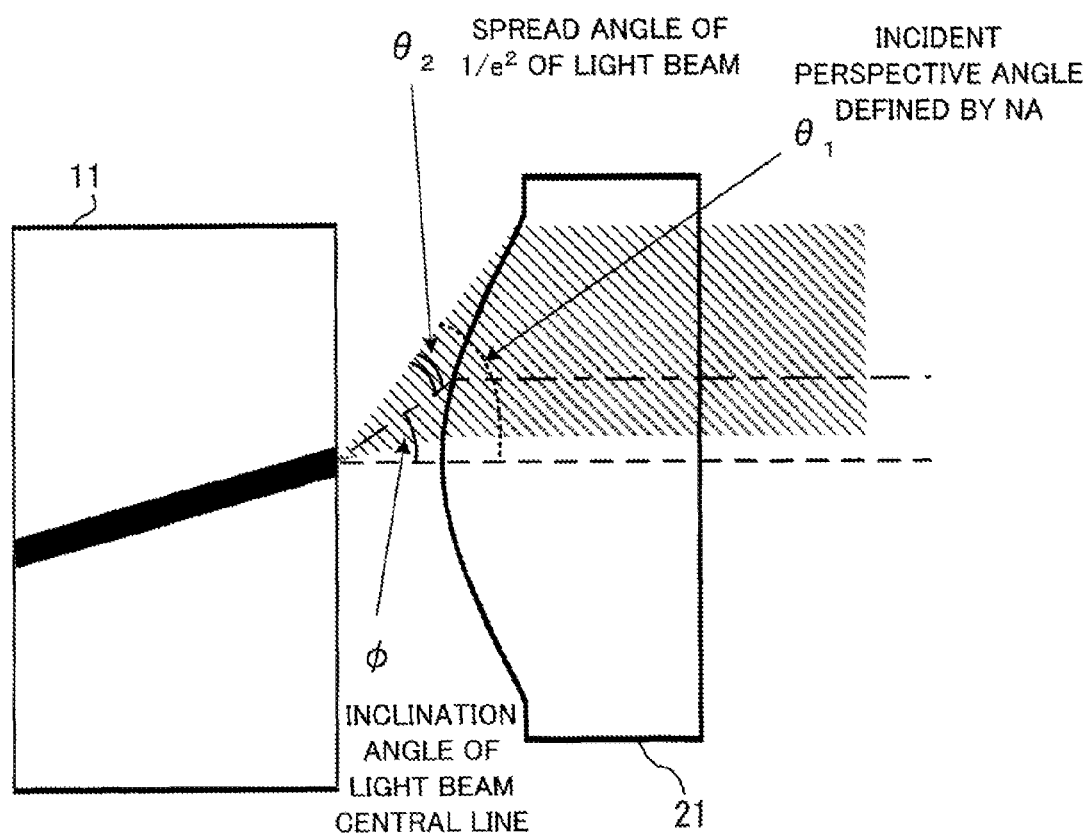
FIG. 12 illustrates an inclination angle of a central line of a light beam.
Figure 13:
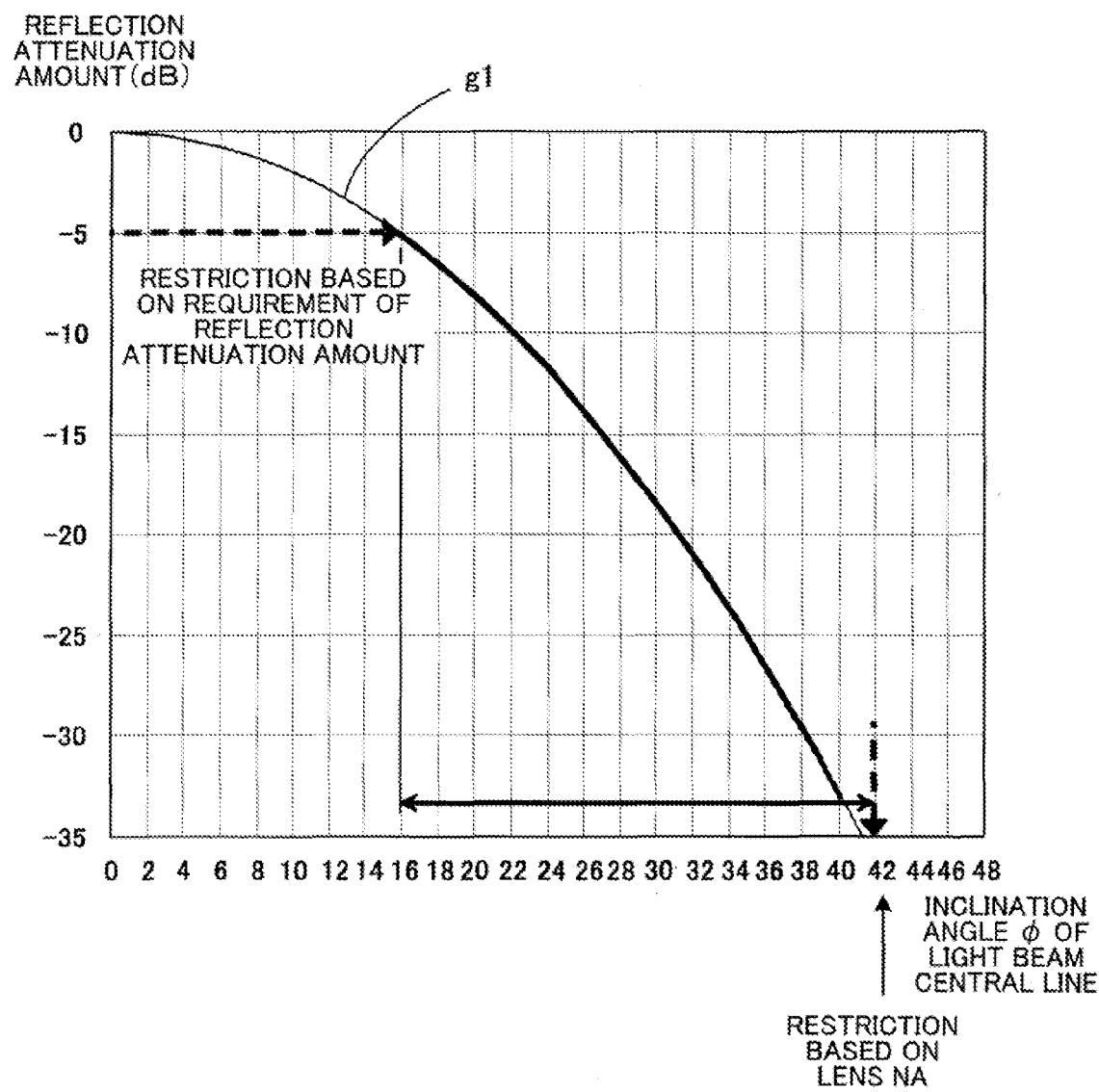
FIG. 13 illustrates a relationship between a reflection attenuation amount and the inclination angle of the central line of the light beam.

Next, a range of an inclination angle of a central line of a light beam (hereinafter, referred to as a light beam central line) output from the SOA 11 will be described. FIG. 12 illustrates an inclination angle of a light beam central line. FIG. 13 illustrates a relationship between the reflection attenuation amount and an inclination angle of the light beam central line. The horizontal axis represents the inclination angle (φ) of the light beam, and the vertical axis represents the reflection attenuation amount (dB) of the end face of the SOA.

A lower limit of an inclination angle φ of a light beam central line is first calculated. In an amplifier such as an SOA, the total reflection attenuation amount is suppressed to, for example, −40 dB or less as an index. As described above, an AR coat is applied to an output end face of the SOA 11, which provides the reflection attenuation amount of −30 to −35 dB. Accordingly, for the purpose of lowering the reflection attenuation amount down to −40 dB, a gain of 5 to 10 dB needs to be more lowered.

A graph g1 of FIG. 13 illustrates a relationship between the inclination angle of the light beam central line of the SOA 11 and the reflection attenuation amount of the end face of the SOA (obtained based on a calculation described in the above-described "Analysis of antireflection coatings on angled facet semiconductor laser amplifiers"). As can be seen from the graph g1 of FIG. 13, the inclination angle φ of the light beam central line may be set to 16 degrees or more in order to obtain the reflection attenuation amount of −5 dB or less.

An upper limit of the inclination angle φ of the light beam central line is calculated below. For the purpose of lowering the reflection attenuation amount of the end face of the SOA, the inclination angle φ of the light beam central line may be increased. However, when the inclination angle φ extremely increases, optical coupling loss due to the eclipse of a lens occurs this time. Therefore, an upper limit of the inclination angle for suppressing the optical coupling loss due to the eclipse needs to be determined.

In a recent lens, a lens with a large NA of appropriately 0.85 is obtained. In this case, an incident perspective angle $\theta_1$ of the lens is equal to approximately 58 degrees ($=\sin^{-1}(1\cdot 0.85)$) based on the formula (1).

On the other hand, one side angle $\theta_2$ of the spread angle of a light beam intensity $1/e^2$ of the SOA 11 is approximately 16 degrees in a recent device with a small spread angle. Accordingly, the maximum inclination angle φ of the light beam central line is equal to 58−16=42 degrees under the above-described conditions. Based on the above-described facts, the inclination angle φ of the light beam central line is in a range of 16°≦φ≦42°, and the SOA that outputs a light beam in this range is used as an object. In general, the incident perspective angle defined by the NA of a lens is set to more than the sum of the inclination angle φ and the one side angle $\theta_2$ of the spread angle of the light beam.

Figure 14:
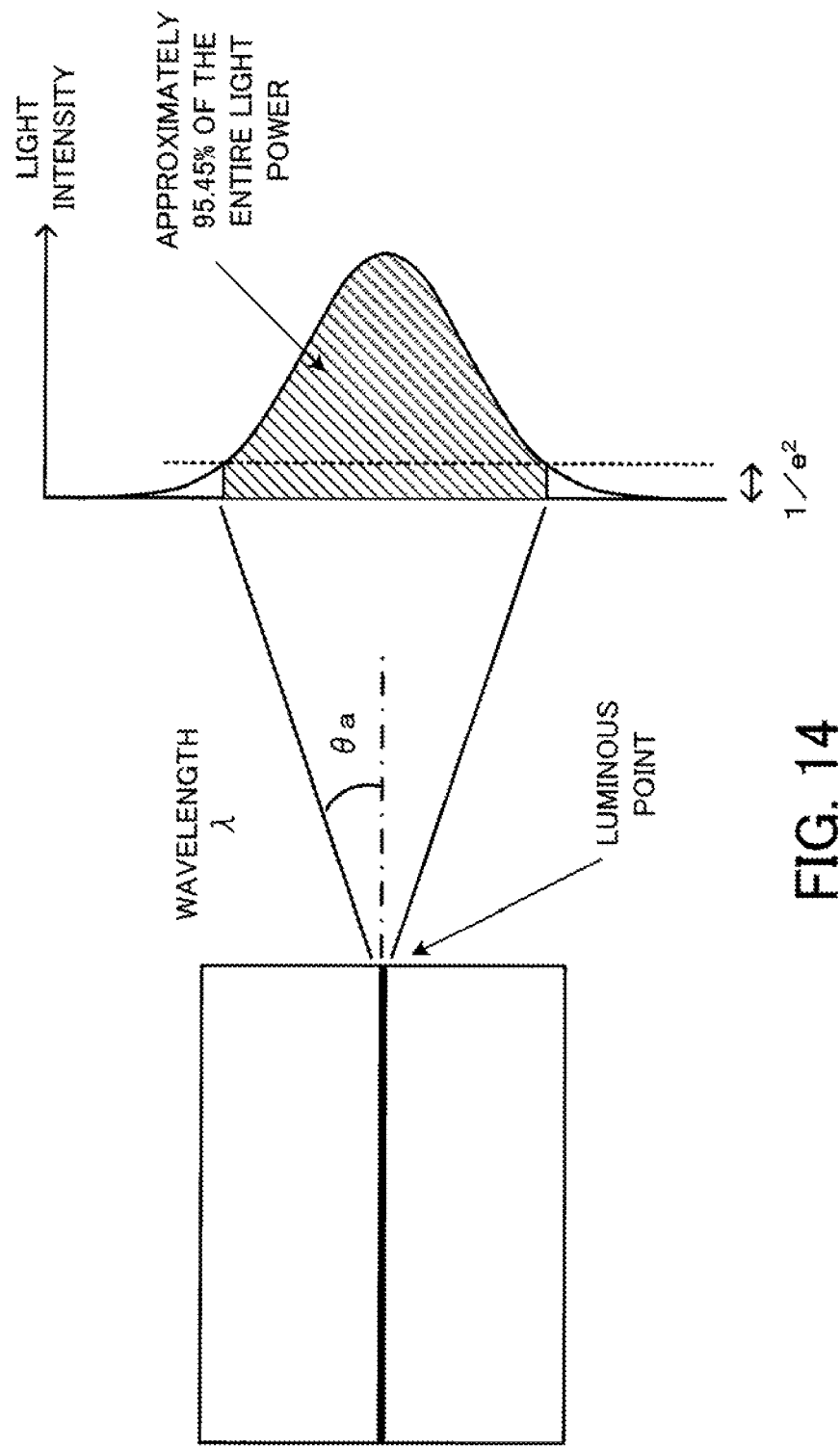
FIG. 14 describes a spot size.

The above-described $1/e^2$ will be simply described. FIG. 14 is a view for describing a spot size. A spread distribution of the light beam is usually approximated to a normal distribution, and represents the degree of spread of the light beam. In this case, a half value of $1/e^2$ as a peak power of the normal distribution is referred to as a spot size (ω), and power of an area of 2ω of −ω to +ω is equal to approximately 95.45% of the entire power.

When considering that a spread up to any level may be investigated in the spread of the light beam, the SOA is designed such that a spread portion corresponding to this spot size can be captured. A radiation angle θa from a luminous point can be derived from the following formula (2):

$$\theta a = \tan^{-1}(\lambda/\pi \cdot \omega) \quad (2)$$

where λ is a wavelength, and ω is a spot size.

Next, an inclination angle of an intra-SOA 11 waveguide will be described. There is described a range of the inclination angle of the light beam central line output from the SOA 11. Here, a range of the inclination angle of the intra-SOA 11 waveguide is introduced based on the same idea as described above.

Figure 15:
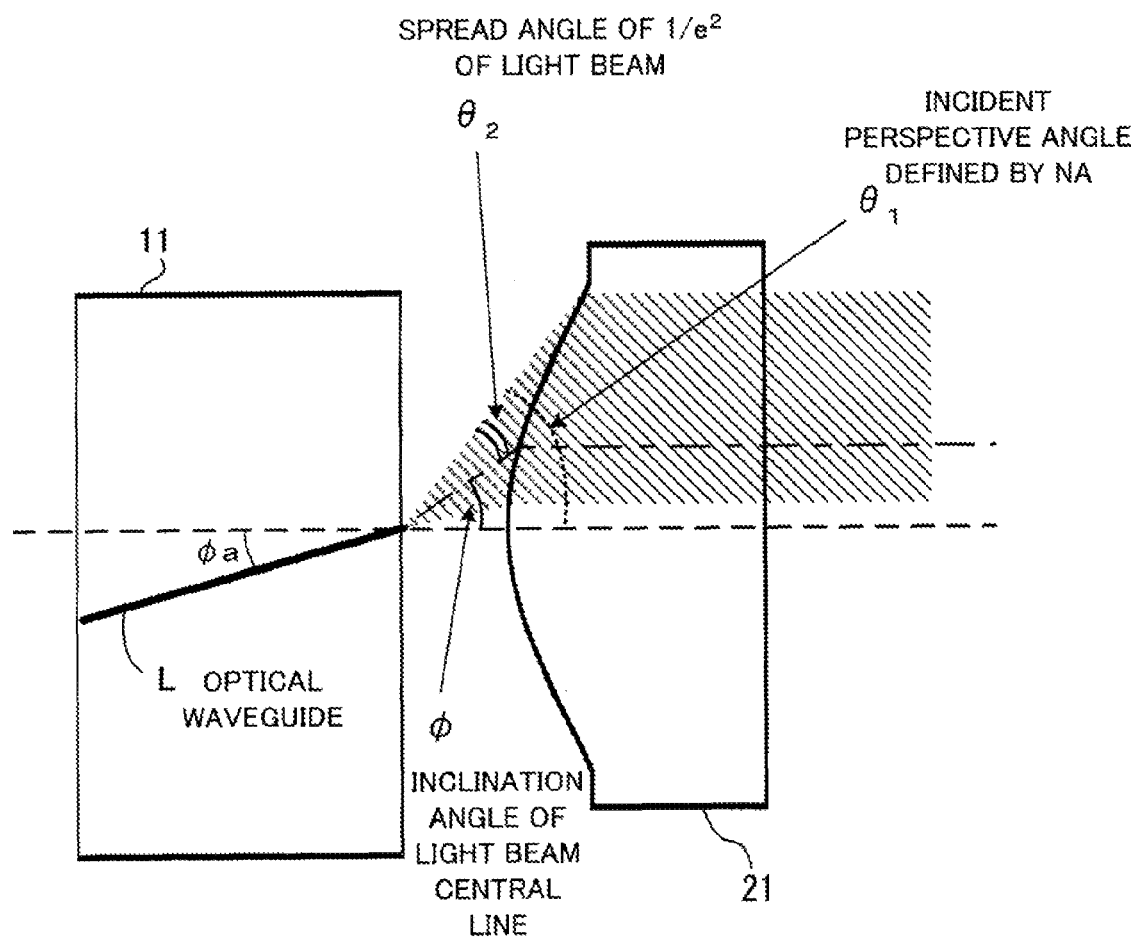
FIG. 15 illustrates an inclination angle of an optical waveguide.
Figure 16:
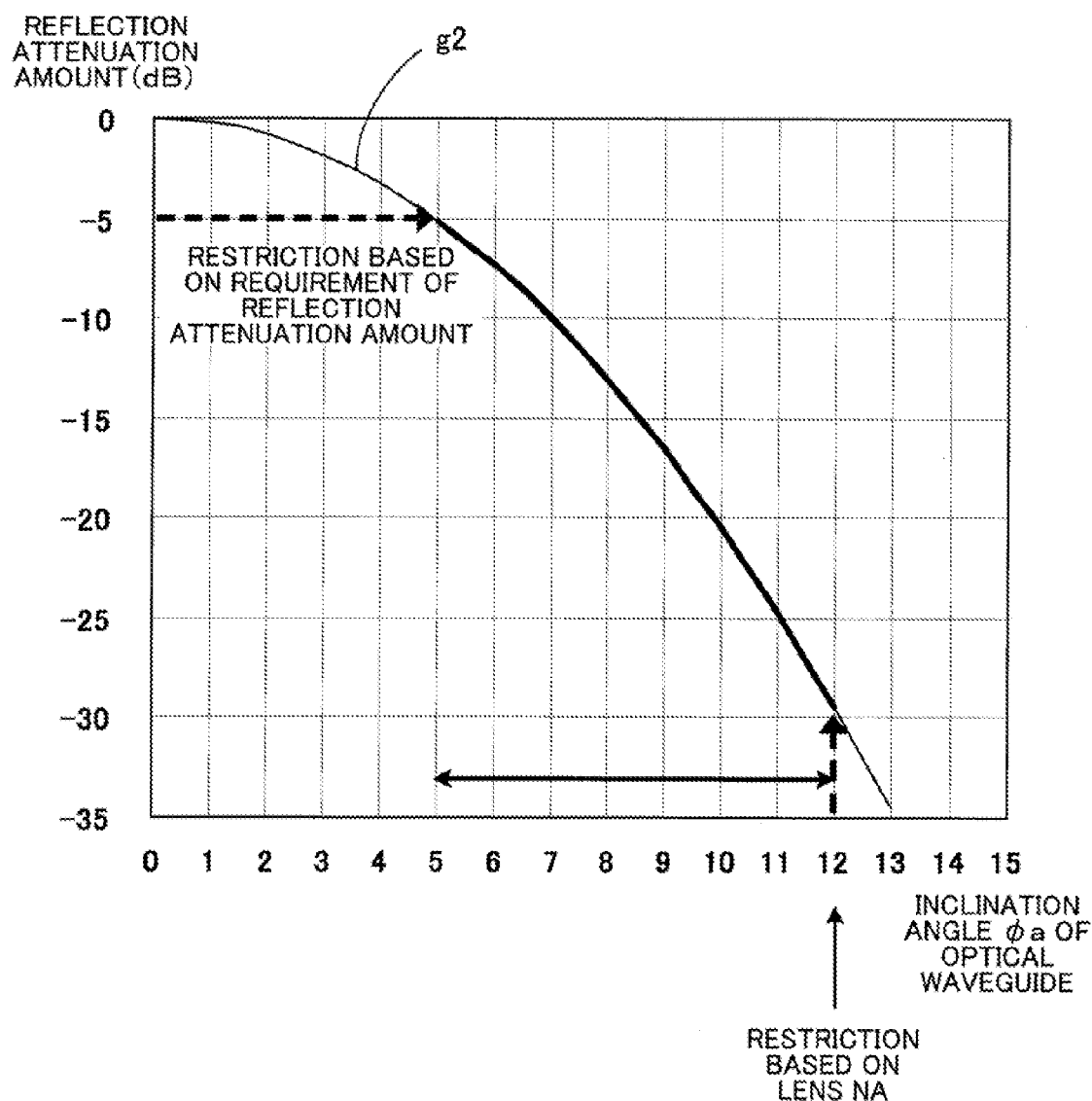
FIG. 16 illustrates a relationship between the reflection attenuation amount and the inclination angle of the optical waveguide.

FIG. 15 illustrates an inclination angle of an optical waveguide. FIG. 16 illustrates a relationship between an inclination angle of the optical waveguide and a reflection attenuation amount. The horizontal axis represents the inclination angle (φa) of the optical waveguide, and the vertical axis represents the reflection attenuation amount (dB) of the end face of the SOA.

A lower limit of an inclination angle φa of an optical waveguide is first calculated. In an amplifier such as an SOA, the total reflection attenuation amount is suppressed to, for example, −40 dB or less as an index. As described above, an AR coat is applied to an output end face of the SOA, which produces the reflection attenuation amount of −30 to −35 dB. Accordingly, for the purpose of lowering the reflection attenuation amount down to −40 dB, a gain of 5 to 10 dB needs to be more lowered.

A graph g2 of FIG. 16 illustrates a relationship between the inclination angle φa of the intra-SOA 11 waveguide L and the reflection attenuation amount of the end face of the SOA. As can be seen from the graph g2 of FIG. 16, the inclination angle φa of the optical waveguide may be set to 5 degrees or more in order to obtain the reflection attenuation amount of −5 dB or less.

Next, an upper limit of the inclination angle φa of the optical waveguide L is calculated. For the purpose of lowering the reflection attenuation amount of the end face of the SOA, the inclination angle φa of the optical waveguide L may be increased. However, when the inclination angle φa extremely increases, optical coupling loss due to the eclipse of a lens occurs this time. Therefore, an upper limit of the inclination angle φa for suppressing the optical coupling loss due to the eclipse needs to be determined.

Suppose that the NA of a lens is set to 0.85. In this case, an incident perspective angle $\theta_1$ of a lens at this time is equal to approximately 58 degrees ($=\sin^{-1}(1\cdot 0.85)$) based on the formula (1). On the other hand, one side angle $\theta_2$ of the spread angle of a light beam intensity $1/e^2$ of the SOA 11 is approximately 16 degrees. Accordingly, the maximum inclination angle φ of the light beam central line is equal to 58−16=42 degrees.

Accordingly, suppose that a refractive index of the intra-SOA 11 waveguide L is taken as n. In this case, n·sin φa=1·sin (42° is obtained based on Snell's law, and therefore, φa=12° is obtained. Based on the above-described facts, the inclination angle φa of the optical waveguide L is in a range of 5°≦a≦12°, and the SOA having the optical waveguide L of the inclination angle φa in this range is used as an object with respect to a normal to the end face of the SOA.

Figure 17:
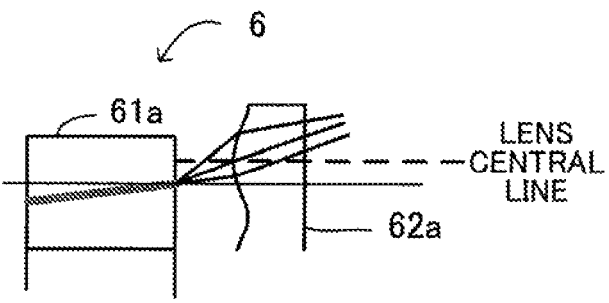
FIGS. 17 and 18 illustrate features of the optical module.
Figure 18:
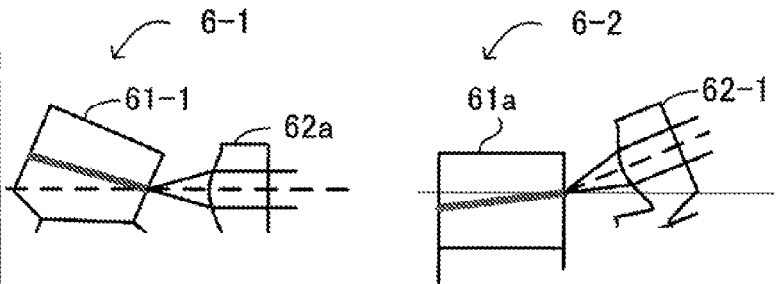
Figure 19:
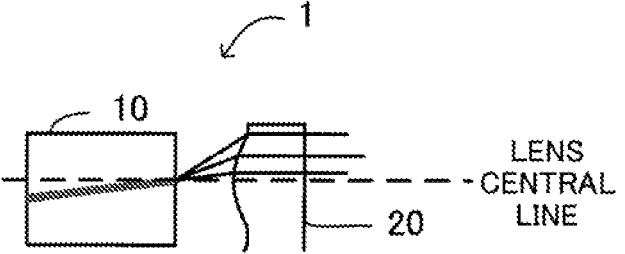
FIG. 19 illustrates an effect of the optical module.

Next, an effect of the optical module 1 will be described. FIG. 17 illustrates features of the optical module 6, and FIG. 18 illustrates features of the optical modules 6-1 and 6-2. Further, FIG. 19 illustrates an effect of the optical module 1.

Figure 27:
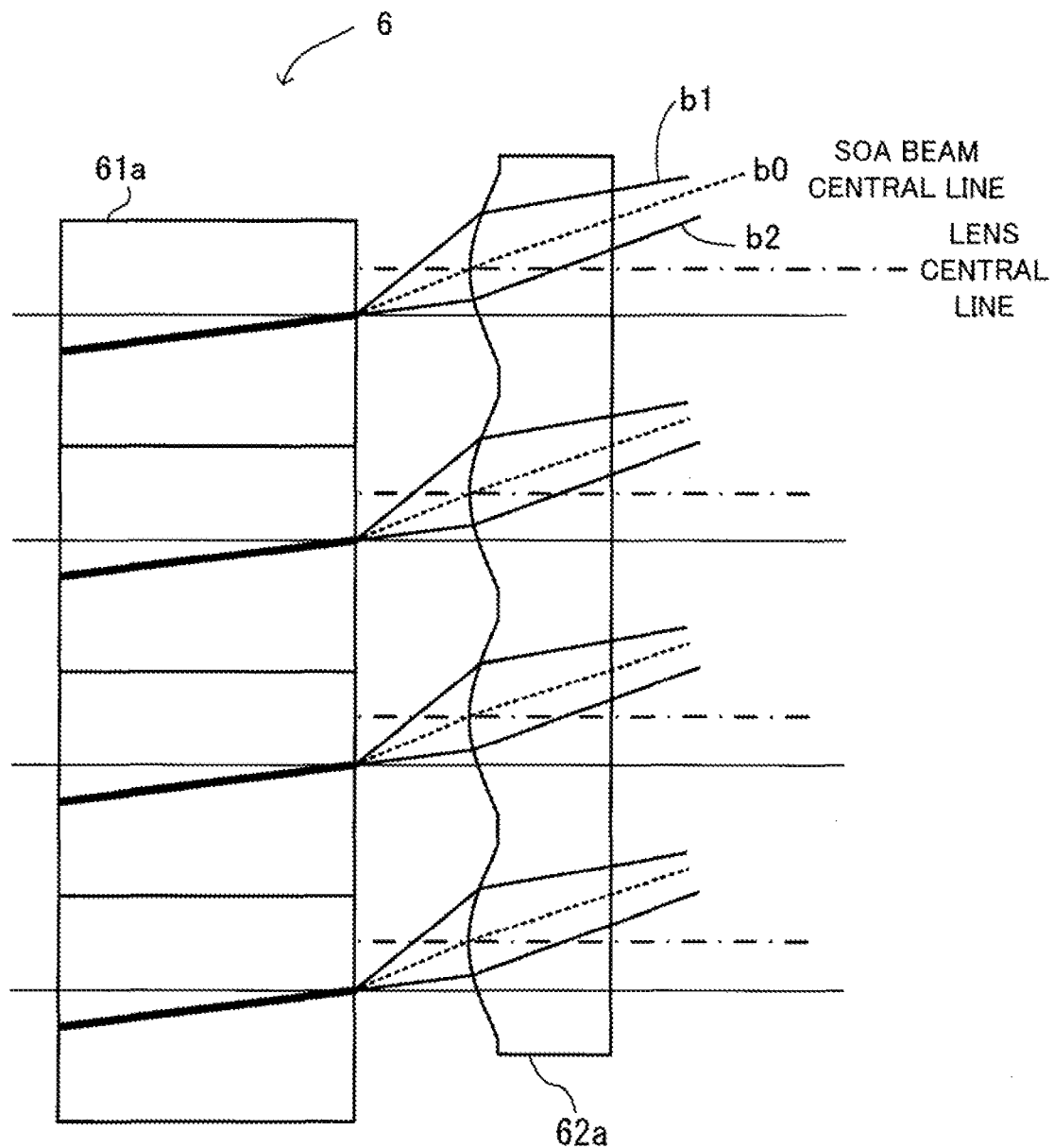
FIG. 27 illustrates the optical coupling between the SOA array and the lens array.
Figure 28:
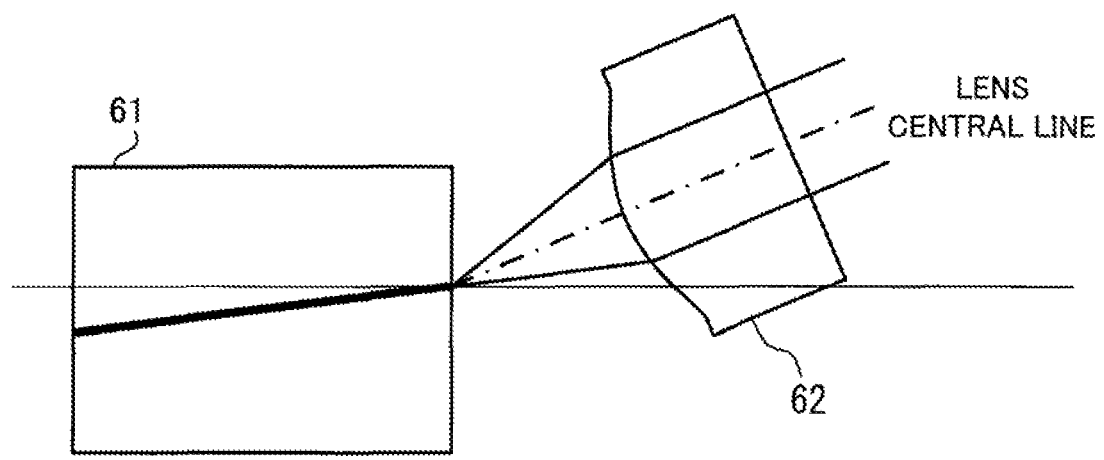
FIG. 28 illustrates the optical coupling between the SOA and the lens.

In FIG. 17, a manufacturing cost does not increase in the optical module 6 having a conventional structure illustrated in FIG. 27. However, since output beams from an SOA array 61a are obliquely incident on the central points of the respective lenses of the lens array 62a, parallel light beams fail to be generated in the lens array 62a, and therefore, optical coupling loss is increased with respect to the optical fiber array arranged at a subsequent stage.

Figure 29:
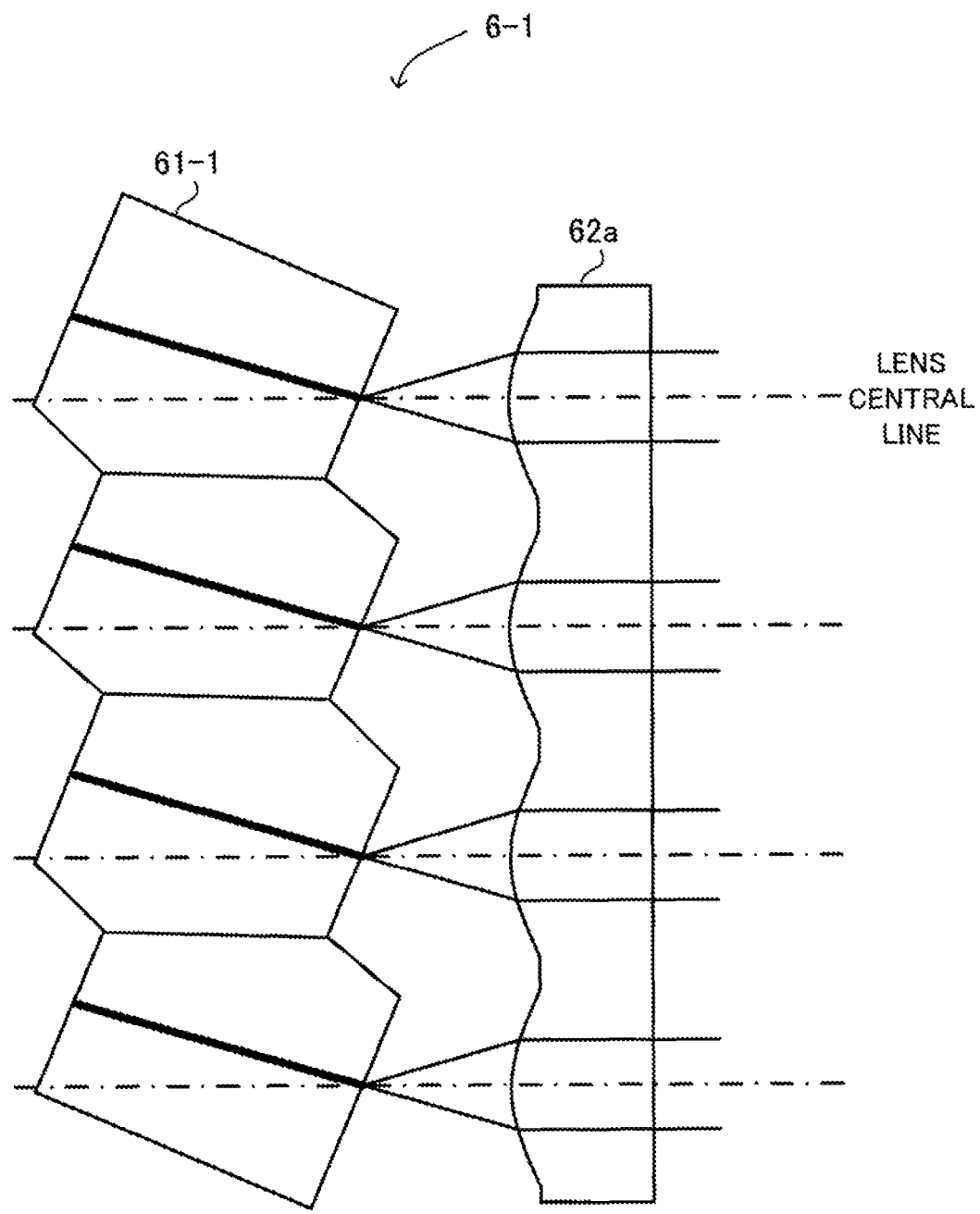
FIG. 29 illustrates the optical coupling between the SOA array and the lens array.
Figure 30:
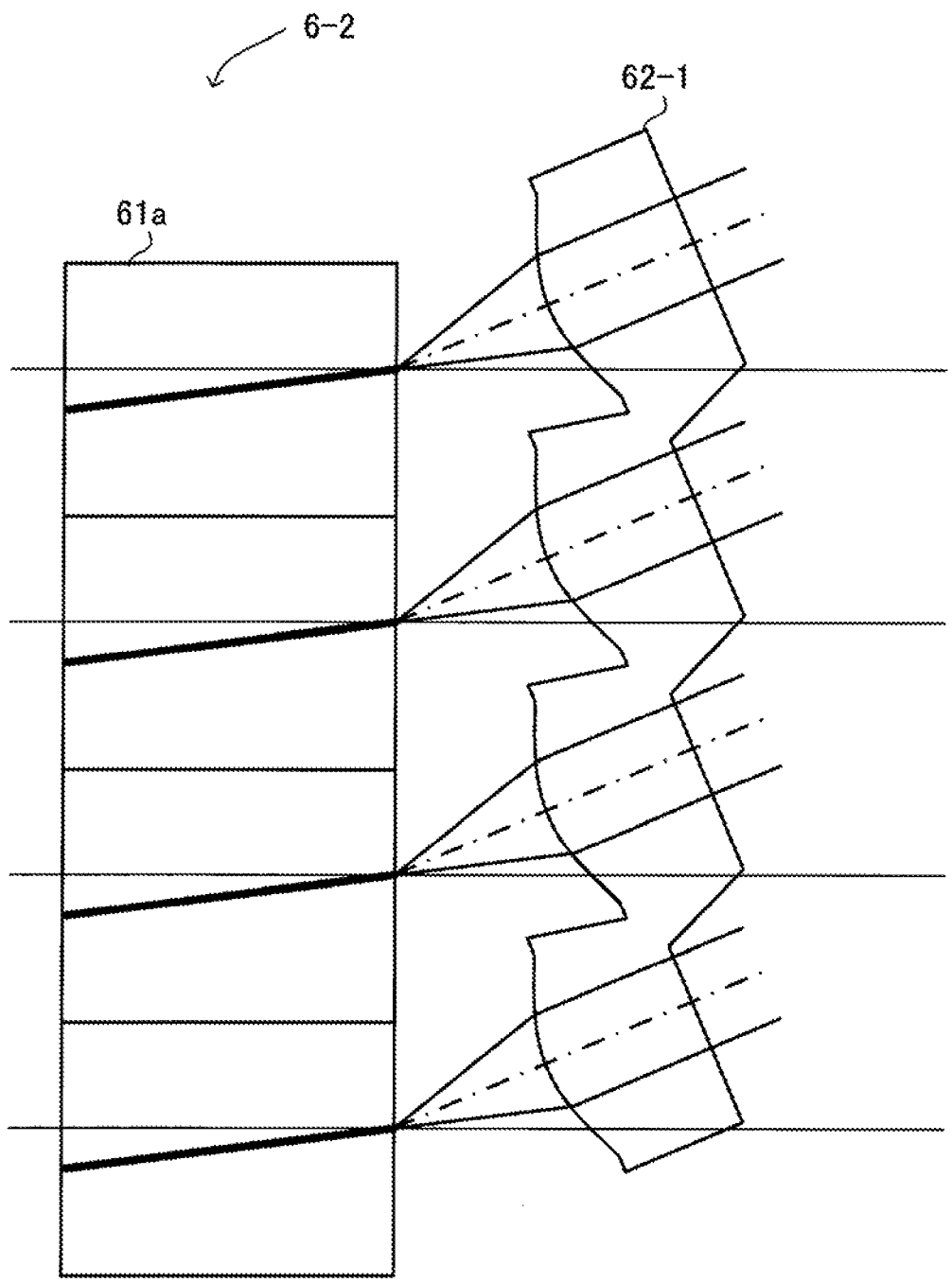
FIG. 30 illustrates the optical coupling between the SOA array and the lens array.

In FIG. 18, in the optical modules 6-1 and 6-2 having the conventional structures illustrated in FIGS. 29 and 30, the SOA and the lens are arranged such that a central beam of output beams from the SOA coincides with a central line of the lens in parallel. This arrangement permits the parallel beams to be output from the lens and suppresses increase in the optical coupling loss.

However, to realize such an arrangement, the SOA array 61-1 and the lens array 62-1 have distorted shapes. Manufacturing for providing steps is difficult and further, a cost for manufacturing parts of the SOA array 61-1 and the lens array 62-1 significantly increases.

As compared with those optical modules, in the optical module 1 illustrated in FIG. 19, a light beam output end face of the SOA array 10 and a lens main face of the lens array 20 are arranged in parallel, and an output point of the light beam obliquely output from each SOA and a central line of a corresponding lens coincide with each other, thereby making the light beam incident on the lens. This configuration makes it possible to generate parallel beams of a plurality of channels in the lens array 20, and therefore, to suppress the increase in optical coupling loss with respect to the optical fiber array arranged at a subsequent stage.

Since the SOA single elements are aligned and arrayed in parallel to each other and also the lens single units are aligned and arrayed in parallel to each other, manufacturing is easy and a manufacturing cost can be reduced. As can be seen from the above discussion, low loss and low cost are compatible with each other in the optical module 1. As compared with the conventional modules, an actual measurement exhibits a half or less in optical coupling loss, and an estimated cost is one fifth or less.

Figure 20:
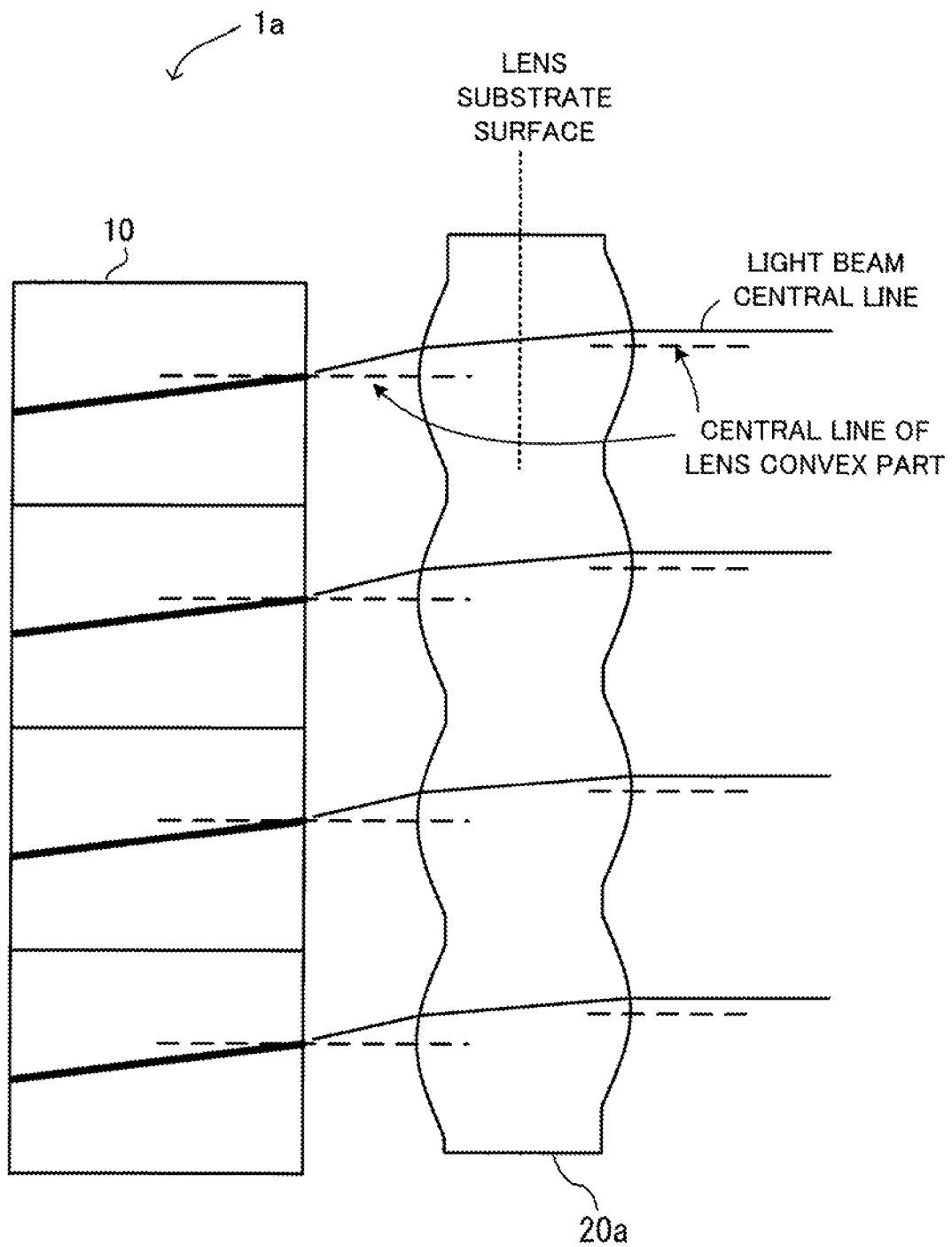
FIGS. 20 and 21 illustrate example modifications of the optical module.
Figure 21:
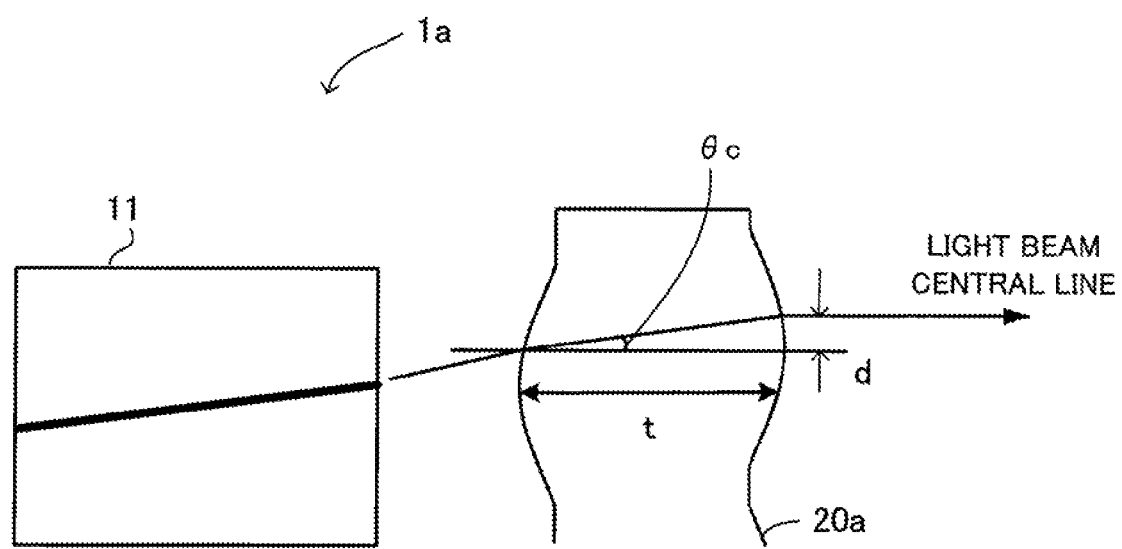

Next, example modifications of the optical module 1 will be described. FIGS. 20 and 21 each illustrate an example modification of the optical module. An optical module 1a includes an SOA array 11 and a lens array 20a. The lens array 20a is a lens array in which both of a front surface and a rear surface have convex parts of the lens.

Further, the convex part of the front surface and that of the rear surface are not arranged on the same line perpendicular to the lens substrate surface. The optical module 1a has a structure in which a central position of the rear surface convex part is shifted with regard to that of the front surface convex part in the array direction by an amount d equal to a function of an oblique angle θc of a light beam, a thickness t of the lens substrate, and the refraction amount of an oblique light beam in the lens substrate after incidence to the lens.

The shift amount of the central point of the lens convex part is represented by the following formula (3).

$$d = t \cdot \tan \theta c \qquad (3)$$

As can be seen from the above discussion, in the case of using the lens array in which both of a front surface and a rear surface have convex parts, parallel beams can be generated efficiently by using the lens array 20a in which a central point of the convex part of the front surface and that of the convex part of the rear surface are shifted from each other.

Figure 22:
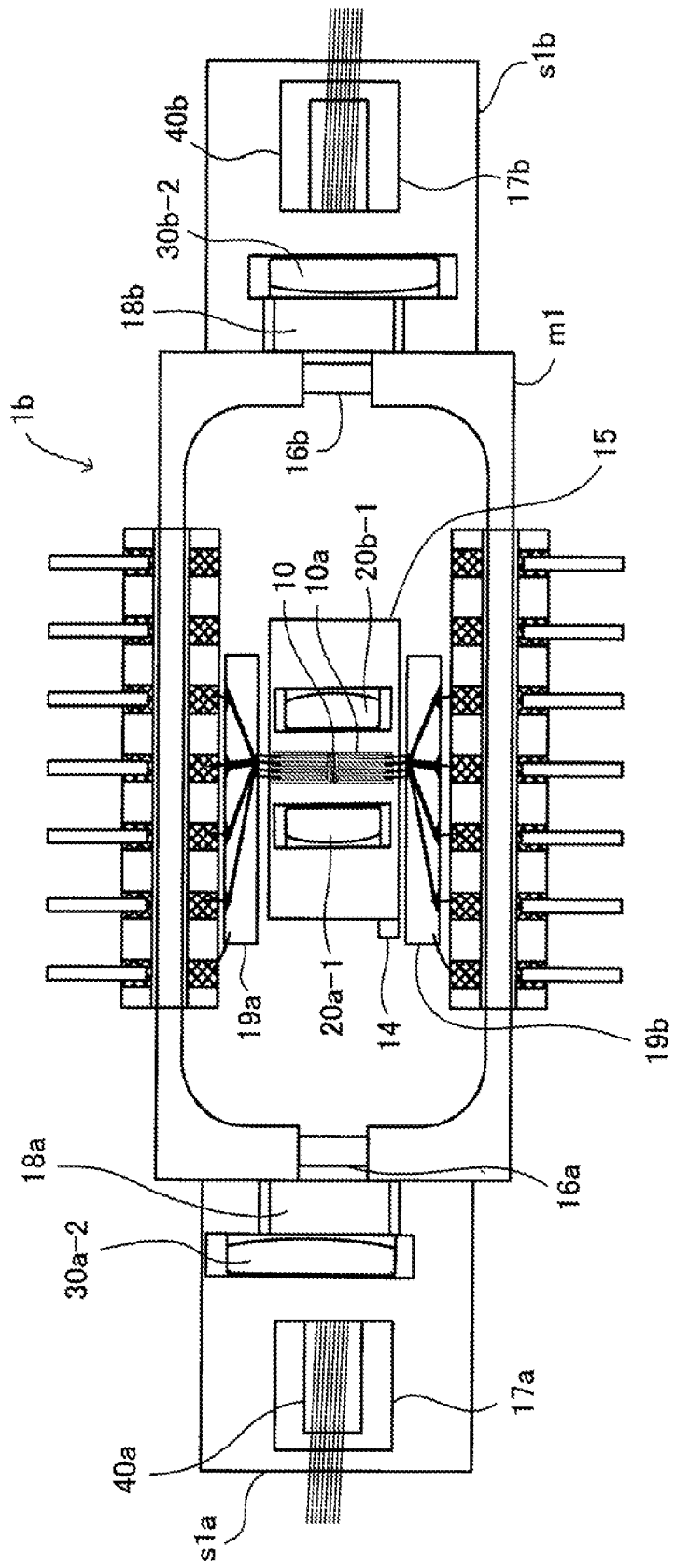
FIG. 22 illustrates an example configuration of an SOA array module.
Figure 23:
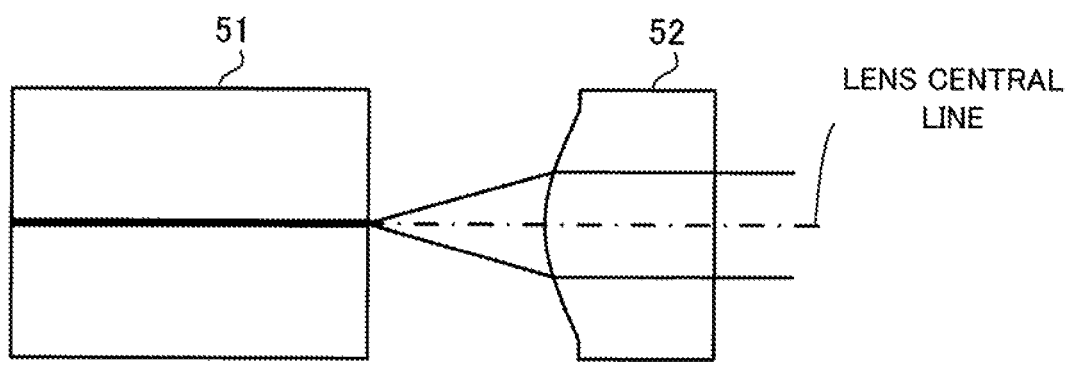
FIG. 23 illustrates the optical coupling between the LD and the lens.
Figure 24:
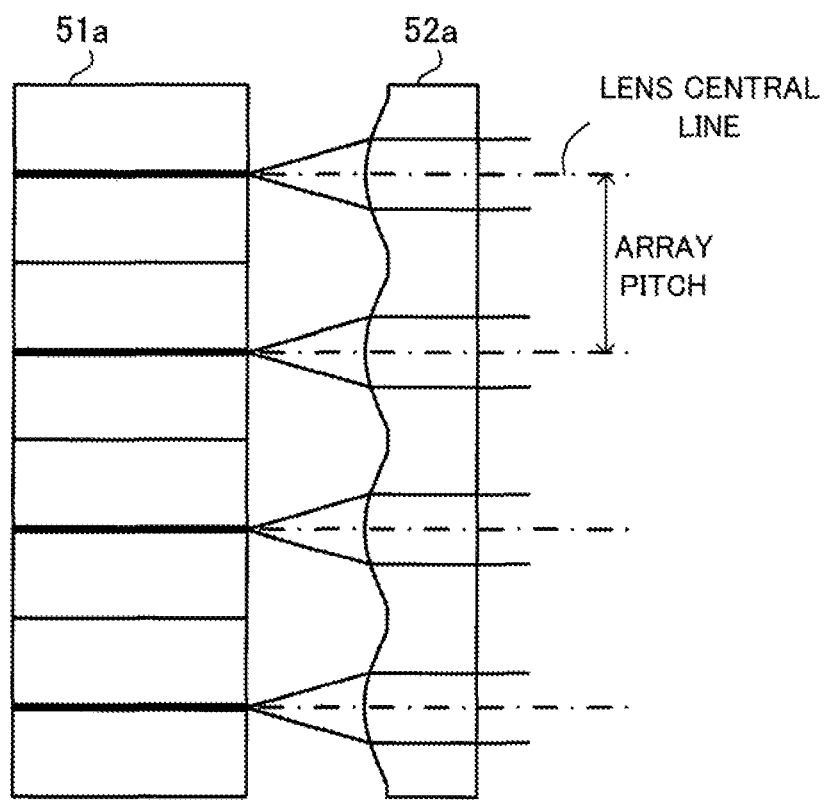
FIG. 24 illustrates the optical coupling between an LD array and a lens array.
Figure 25:
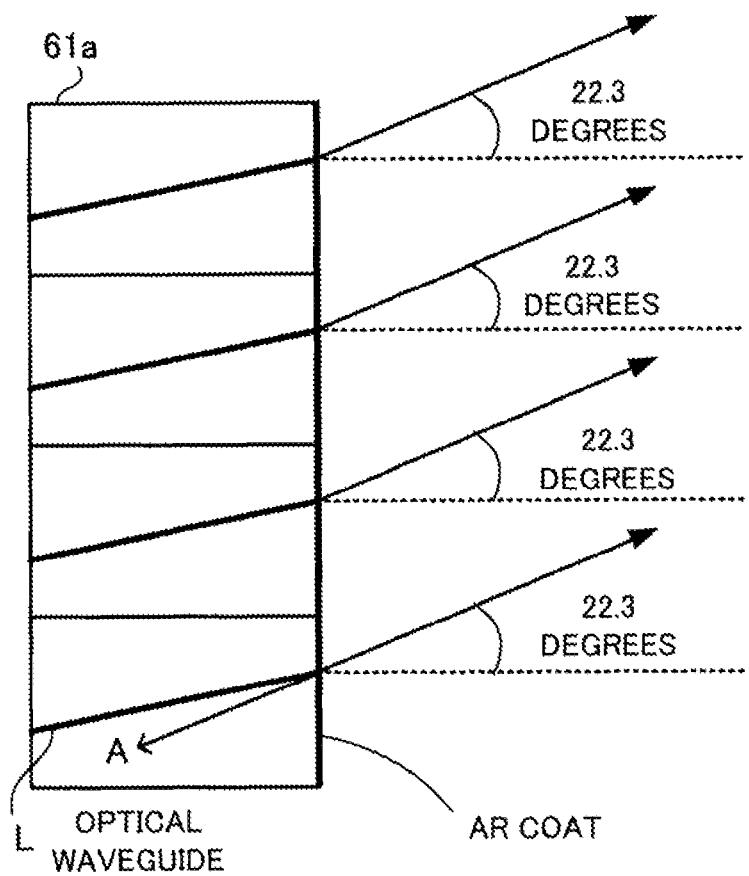
FIG. 25 illustrates an SOA array.
Figure 26:
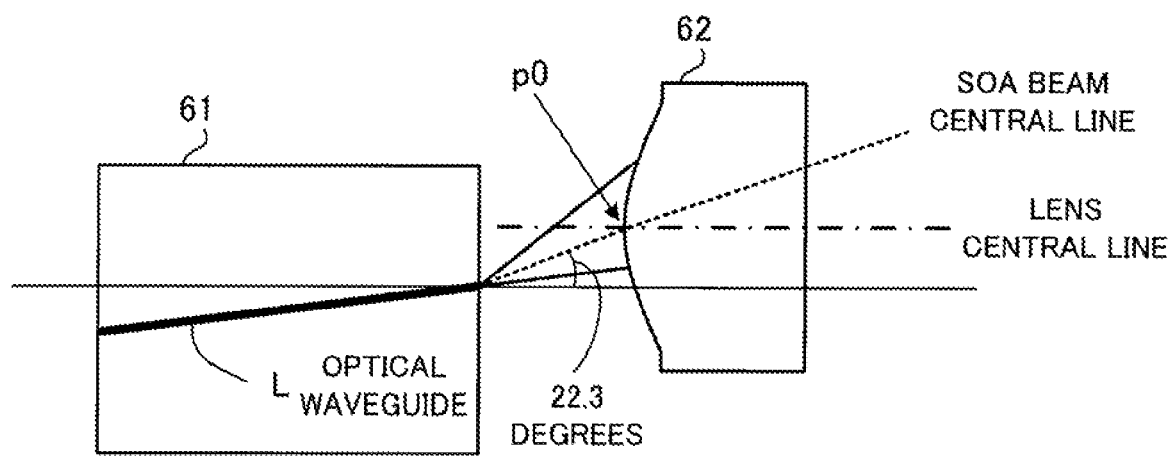
FIG. 26 illustrates the optical coupling between the SOA and the lens.

Next, a structure of an SOA array module to which the optical module 1 is applied will be described. FIG. 22 illustrates an example structure of the SOA array module. The SOA array module 1b is a module configured by a main package m1 and sub-packages s1a and s1b.

Within the main package m1, an SOA array 10, an SOA carrier 10a, lenses 20a-1 and 20b-1 (correspond to the lenses of the lens array 20), a thermistor 14, a peltiert device 15, hermetic windows 16a and 16b, and fan-out terminal units 19a and 19b are arranged.

Here, since an electrode pitch of the SOA carrier 10a and a ceramic terminal pitch of the main package m1 are significantly different from each other, the fan-out terminal units 19a and 19b for matching a pitch are inserted into the SOA carrier 10a and a ceramic terminal of the main package m1. FIG. 22 illustrates a state where the fan-out terminal units 19a and 19b are arranged at both sides of the SOA carrier 10a and connected to each other through a strip line.

Further, within the main package m1, the lenses 20a-1 and 20b-1 are arranged together with the peltiert device 15 in the vicinity of the SOA array 10 and sealed with the hermetic windows 16a and 16b, thereby shielding the SOA array 10 from moisture and oxygen.

Further, the sub-packages s1a and s1b are fixed on the outside of the main package m1 through the hermetic windows 16a and 16b. The sub-package s1a includes an optical isolator 18a for preventing reflection, a condenser lens array 30a-2, an optical fiber array 40a, and a welding and fixing sleeve 17a. On the other hand, the sub-package sib includes an optical isolator 18b for preventing reflection, a condenser lens array 30b-2, an optical fiber array 40b, and a welding and fixing sleeve 17b. The components are aligned and then welded and fixed by YAG laser.

Here, when forming the SOA array module 1b, lenses and lens holders formed in a press processing by using a mold are used. Further, the SOA array 10 and the lens arrays 20a-1 and 20b-1 are previously aligned and fixed so as to form one fixed part. The condenser lens array 30a-2 and the optical fiber array 40a are previously aligned and fixed so as to form another fixed component. Further, the condenser lens array 30b-2 and the optical fiber array 40b are previously aligned and fixed so as to form yet another fixed component. These fixing components are aligned, so as to form the module. This process makes the alignment of the optical system easy in order to form the optical module.

The proposed optical module according to this embodiment suppresses the optical coupling loss and reduces a cost.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that various changes, substitutions and alterations could be made hereto without departing from the spirit and scope of the invention.

What is claimed is:

1. An optical module comprising:
   an optical element array being an array of a plurality of optical elements each outputting a light beam in a direction oblique to a normal to an end face thereof; and
   a lens array comprising a plurality of lenses corresponding to the respective optical elements;
   wherein an output point of the light beam of each optical element is on a central line of the corresponding lens;
   wherein an incident perspective angle defined by a numerical aperture of the lens is set to more than the sum of an inclination angle between a central line of the light beam output from the optical element and the normal, and one side angle of a spread angle of the light beam; and
   wherein an inclination angle $\omega$ between a central line of the light beam output from the optical element and the normal is in a range of $16° \leq \phi \leq 42°$.

2. The optical module according to claim 1, wherein an inclination angle $\phi a$ between an optical waveguide within the optical element and the normal is in a range of $5° \leq \phi a \leq 12°$.

3. The optical module according to claim 1, wherein in an optical coupling portion between the optical element array and the lens array, a light beam output from the optical element passes through an off-center point on one side surface of the lens.

4. The optical module according to claim 1, wherein each of the lenses is a distributed refractive index lens whose refractive index decreases in a radial direction.

5. The optical module according to claim 1, wherein low melting-point glass is used as a material of the lenses of the lens array.

6. The optical module according to claim 1, wherein the lens array has a structure in which convex parts are formed on both of a front surface and rear surface of the lens, and a central position of a rear surface convex part is shifted with regard to that of a front surface convex part in the array direction by an amount equal to a function of an oblique angle of a light beam, a thickness of the lens substrate, and the refraction amount of an oblique light beam in the lens substrate after incidence to the lens.

7. The optical module according to claim 1, further comprising:
   an optical fiber array being an array of a plurality of optical fibers; and
   a condenser lens array being an array of a plurality of condenser lenses corresponding to the respective optical fibers, each condenser lens condensing a parallel beam from the corresponding lens into the corresponding optical fiber.

8. The optical module according to claim 7, wherein a lens main face of the lens array, a lens main face of the condenser lens array, and an input end face of the optical fiber array are arranged in parallel to an end face of the optical element array.

9. The optical module according to claim 7, wherein:
   the lens array has a flat-plate structure on one of a front surface and rear surface, and is arranged such that the one of the front surface and rear surface having the flat-plate structure faces an end face of the optical elements; and
   the condenser lens array has a flat-plate structure on one of a front surface and rear surface, and is arranged such that the one of the front surface and rear surface having the flat-plate structure faces an end face of the optical fiber array.

10. The optical module according to claim 7, wherein an array isolator in which optical isolators are arrayed is arranged between the lens array and the condenser lens array.

11. The optical module according to claim 7, wherein:
    the optical element array and the lens array are previously aligned and fixed so as to form a first fixed part;
    the condenser lens array and the optical fiber array are previously aligned and fixed so as to form a second fixed part; and
    the first fixed part and the second fixed part are aligned so as to form the module.

12. The optical module according to claim 1, wherein when a light beam output point of the optical element and an optical axis of the lens coincide with each other, an optical path within the optical element and the optical axis fail to coincide with each other.

* * * * *